United States Patent [19]

Pappas

[11] Patent Number: 5,473,439
[45] Date of Patent: Dec. 5, 1995

[54] MODEL-BASED HALFTONING OF COLOR IMAGES

[75] Inventor: Thrasyvoulos N. Pappas, Summit, N.J.

[73] Assignee: AT&T Corp., Murray Hill, N.J.

[21] Appl. No.: 965,485

[22] Filed: Oct. 23, 1992

[51] Int. Cl.$^6$ .............................. H04N 1/40; H04N 1/46
[52] U.S. Cl. ...................... 358/298; 358/443; 358/534
[58] Field of Search ............................... 358/298, 443, 358/447, 456, 465, 466, 534; 382/54

[56] References Cited

U.S. PATENT DOCUMENTS

| | | | |
|---|---|---|---|
| 4,084,196 | 4/1978 | Tisue et al. | 358/283 |
| 5,014,333 | 5/1991 | Miller et al. | 382/54 |
| 5,051,844 | 9/1991 | Sullivan | 358/456 |
| 5,055,942 | 10/1991 | Levier | 358/298 X |
| 5,072,291 | 12/1991 | Sezikawa | 358/456 X |
| 5,191,640 | 3/1993 | Plass | 358/448 X |
| 5,214,517 | 5/1993 | Sullivan et al. | 358/456 |
| 5,239,390 | 8/1993 | Tai | 358/298 X |

FOREIGN PATENT DOCUMENTS

| | | | |
|---|---|---|---|
| 0493101A2 | 7/1992 | European Pat. Off. | G06K 15/00 |
| 61-281768 | 12/1986 | Japan | H04N 1/40 |
| WO90/04898 | 8/1990 | WIPO . | |
| WO92/17982 | 3/1992 | WIPO | H04N 1/46 |

OTHER PUBLICATIONS

G. Goertzel and G. R. Thompson, "Digital Halftoning on the IBM 4250 Printer," IBM J. Res. Devlop., vol. 31, No. 1, 2–15, Jan. 1987.
A. K. Jain, "Fundamentals of Digital Image Processing," Prentice–Hall, Englewood Cliffs, N.J. (1989). (A book).
T. N. Cornsweet, "Visual Perception," Academic Press Inc., New York (1970). (A book).
A. N. Netravali and B. G. Haskell, "Digital Pictures," Plenum Press, New York (1988). (A book).
R. Ulichney, "Digital Halftoning," The MIT Press (1987), 239–242.
J. L. Mannos, D. J. Sakrison, "The Effects of a Visual Fidelity Criterion on the Encoding of Images," IEEE Trans. Inf. Theory, vol. IT–20, No. 4, 525–536 (Jul. 1974).
J. F. Jarvis et al., "A Survey of Techniques for the Display of Continuous Tone Pictures on Bilevel Displays," Computer Graphics and Image Processing, 5, 13–40 (1976).
J. B. Mulligan et al., "Principled Methods for Color Dithering Based on Models of the Human Visual System," SID '92 Digest of Tech. Papers, Boston, Mass., 194–197, May 1992.
A. V. Oppenheim, R. W. Shafer, "Discrete–Time Signal Processing," Prentice Hall (1989) p. 107.
T. N. Pappas, D. L. Neuhoff, "Least–Squares Model–Based Halftoning," Proc. SPIE, vol. 1666, Human Vision, Visual Proc., and Digital Display III, San Jose, Calif., 165–176 (Feb. 1992).
T. N. Pappas, D. L. Neuhoff, "Model–Based Halftoning," Proc. SPIE, vol. 1453, Human Vision, Visual Proc., and Digital Display II, 244–253 (Feb. 1991).

(List continued on next page.)

*Primary Examiner*—Peter S. Wong
*Assistant Examiner*—Eric Frahm
*Attorney, Agent, or Firm*—Thomas A. Restaino

[57] ABSTRACT

A model-based printing method and system for generating color halftone output images corresponding to color input signals. Models for individual printer types allow predicted printer error signals to be generated which can be used to modify the color signals in such manner as to produce output signals which, when applied to the printer, create color halftone images of enhanced quality. In an alternative embodiment, output image signals are selected which minimize an error function based on the difference between (i) a predicted perceived image corresponding to the color image input as filtered by an eye-model filter and (ii) the color halftone image resulting from filtering of the output image by a filter modeling the printer followed by the eye-model filter.

21 Claims, 5 Drawing Sheets

OTHER PUBLICATIONS

D. L. Neuhoff et al., "One-Dimensional Least-Squares Model-Based Halftoning," ICASSP-92, 189-192 (Mar. 1992).

C-K. Dong, "Perceptual Printing of Gray Scale Images," M. S. Thesis, MIT, May 1992.

P. Stucki, "MECCA-A Multiple-Error Correction Computation Algorithm for Bi-Level Image Hardcopy Reproduction," Communications/Computer Science/Engineering Technology, Mar. 2, 1982 (46 pages).

MODEL-BASED HALFTONING OF COLOR IMAGES

FIELD OF THE INVENTION

This invention relates generally to the field of image display technology, and more particularly to the display of images using binary-valued picture elements to approximate a color image.

BACKGROUND OF THE INVENTION

Digital halftoning, sometimes referred to as "spatial dithering," is the process of creating a pattern of pixels with a limited number of colors to create the illusion of a continuous-tone image. The illusion is created by the placement of closely spaced circular spots (or dots) which, in the aggregate, are perceived by the human eye as a continuous image. Digital halftoning is used for the display of continuous tone images in media in which direct rendition of continuous tones is impossible. A common example of the use of digital halftoning is the printing of color images on paper.

A "perfect" printer produces square dots of ink. The size of these square dots is T×T, where T is the dot spacing. However, most printers produce circular dots. In an "ideal" printer, the dots are circular with radius $T/\sqrt{2}$. This is the minimum radius needed to cover a page entirely with ink. However, this means that there is overlap of adjacent dots. This overlap is a source of distortion in the color of the printed image. Moreover, some printers produce ink dots that have a radius larger than $T/\sqrt{2}$, resulting in even more distortion. Color printers use ink of three different colors, typically cyan, magenta, and yellow. Thus, dot overlap may occur between dots of the same or different colors. Dot overlap is but one of several types of distortion caused by non-ideal printers.

Conventional halftoning techniques resist printer distortions, such as dot overlap, by printing colored dots in clusters (or macrodots). One such technique is the "classical" clustered-dot ordered dither. In this technique, image intensity is represented by the size of the macrodots, while their spacing is fixed. This classical technique mimics traditional analog halftoning techniques used in newspaper image printing. In color printing, macrodots of the three different colors are printed. Since the macrodots of different colors typically overlap, the printer distortions affect not only the overall brightness of the image but also the color. Thus, such conventional methods resist distortion at the expense of spatial and color resolution.

SUMMARY OF THE INVENTION

The present invention provides a general framework for the use of printer models in color halftoning. Rather than trying to resist printer distortions, the present invention exploits distortions, such as dot overlap and color interactions, to enhance color and spatial resolution of a resulting displayed color image. These distortions are exploited through the use of a printer model in a color halftoning process.

Illustrative embodiments of the invention are presented which incorporate exemplary color printer models. These models assume that the printed dots are approximately circular and possibly larger than the minimal size required to completely cover the page. The models account for overlap between neighboring dots of the same and different colors. A first illustrative embodiment is presented which concerns application of a printer model in error diffusion halftoning. A second illustrative embodiment incorporates a printer model in least-squares halftoning.

Both illustrative embodiments are presented in a color image facsimile transmission context, wherein images are communicated in non-halftone form suitable for halftoning at the printer. This context illustrates an advantageous use of the invention allowing for coding of an image for communication to a receiving location by any of the available techniques (thereby achieving low bit rates in transmission) and halftoning the image at the receiving location with knowledge of the printer characteristics as expressed in a printer model (thereby enhancing printed image quality). Halftoning may also be performed at a transmitting location given knowledge or an estimate of the printer characteristics expressed in terms of a printer model.

While the discussion herein focuses on application of the invention to color printers, it should be understood that the invention is also applicable to other color display systems, such as cathode-ray tube (CRT) displays.

BRIEF DESCRIPTION OF THE DRAWINGS

FIG. 6b presents the output of a nonseparable printer model in terms of the geometry of FIG. 6a.

DETAILED DESCRIPTION

I. Introduction

A. Models of Visual Perception

Halftoning works because the eye perceives a set of closely spaced color spots as shades of color. Alternatively, it may be said that the eye acts as if it contained a spatial low pass filter. Numerous researchers have estimated the spatial frequency sensitivity of the eye, often called the modulation transfer function (MTF). Typical of such is the following estimate, originally used for predicting the subjective quality of coded images.

$$H(f) = 2.6(0.0192 + 0.114f)\exp\{-(0.144f)^{1.1}\} \quad (1)$$

where f is in cycles/degree. See Mannos, J. L. and D. J. Sakrison, *The Effects of a Visual Fidelity Criterion on the*

Figure 1:
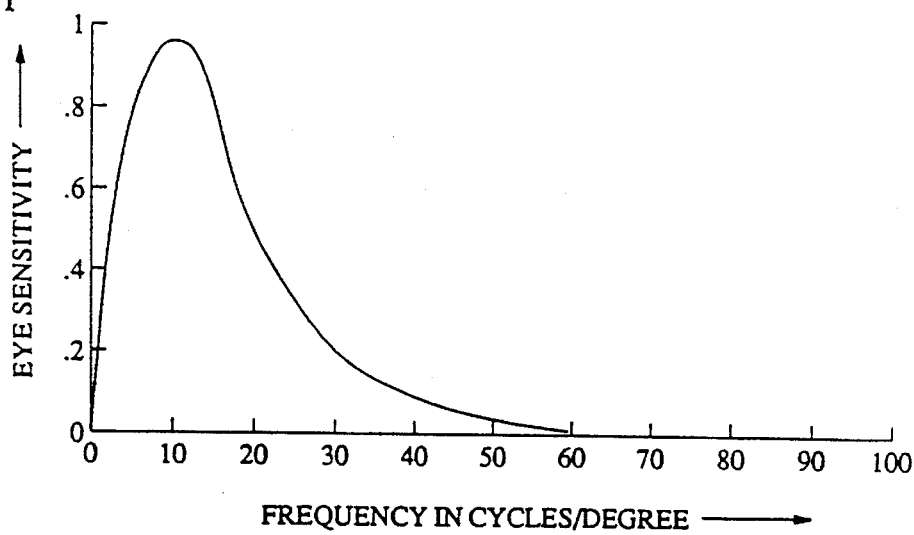
FIG. 1 presents a frequency sensitivity characteristic for the human eye.

*Encoding of Images*, Vol. IT-20, No. 4 IEEE Trans. on Info. Th. 525–36 (July 1974). This MTF based on the Mannos and Sakrison teachings is plotted in FIG. 1. As indicated by Eq. (1), the eye is most sensitive to frequencies around 8 cycles/degree. Others have variously estimated the peak sensitivity to lie between 3 and 10 cycles/degree. The decrease in sensitivity at higher frequencies is generally ascribed to the optical characteristics of the eye (e.g. pupil size). FIG. 1 shows that the sensitivity of the eye has dropped 3 db from its peak at about 3 and 16 cycles/degree, 20 db at 35 cycles/degree and about 46 db at 60 cycles/degree. The decrease in sensitivity at low frequencies accounts for the "illusion of simultaneous contrast" (a region with a certain color level appears darker when surrounded by a lighter color level than when surrounded by a darker) and for the Mach band effect (when two regions with different color levels meet at an edge, the eye perceives a light band on the light side of the edge and a dark band on the dark side of the edge).

The eye is more sensitive to horizontal or vertical sinusoidal patterns than to diagonal ones. Specifically, it is least sensitive to 45 degree sinusoids, with the difference being about 0.6 db at 10 cycles/degree and about 3 db at 30 cycles/degree. This is not considered to be large, but it is used to good effect in the most commonly used halftoning technique for printers.

Figure 2:
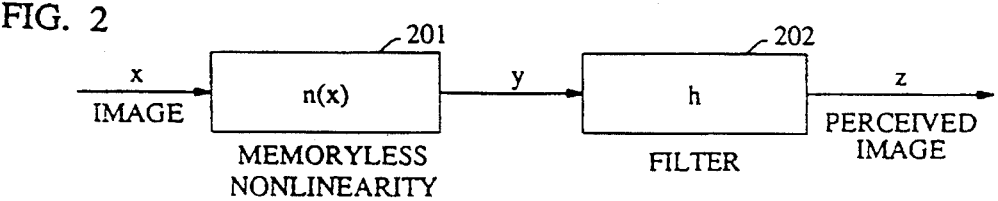
FIG. 2 presents an illustrative eye model.

Many models have been proposed that attempt to capture the central features of human visual perception. For example, see Jain, A. K., *Fundamentals of Digital Image Processing*, Prentice Hall, Englewood Cliffs, N.J. 1989, especially pp. 56–57; Cornsweek, T. N., *Visual Perception*, Academic Press, New York, N.Y., 1970; and Netravali, A. N., and B. G. Haskell, *Digital Pictures: Representation and Compression*, Plenum, New York, N.Y., 1988, especially pp. 292–297. The simplest visual perception models include just a filter, for example the filter of Eq. (1). Another, and perhaps most commonly cited include a memoryless nonlinearity, as shown in FIG. 2. There, the input image, represented by x, is shown being subjected to the memoryless nonlinearity 201 to produce a modified image, y, before being filtered by filter 202, e.g., that of Eq. (1). The output, z, of filter 202 is the perceived image. Such nonlinearities account for Weber's law, which says that the smallest noticeable change in intensity is proportional to intensity (i.e., gray level). Most commonly it is represented as a logarithm or power law (e.g., $x^3$). More complex models include, for example, a filter before the nonlinearity 201 or a bank of filters in place of 202.

Figure 3:
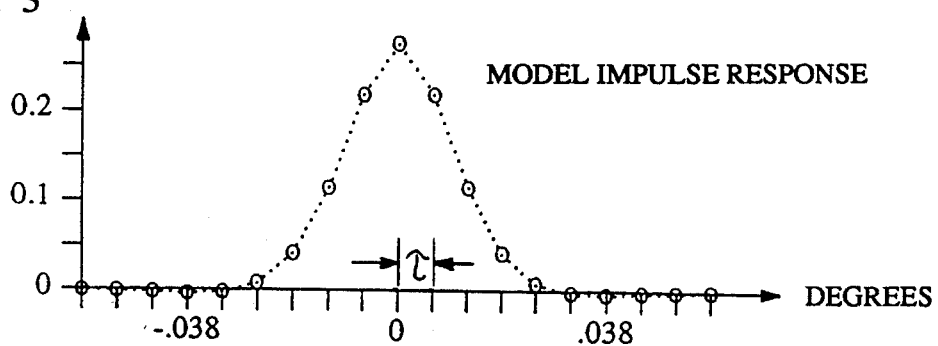
FIG. 3 presents an illustrative impulse response for an FIR filter of an eye model.
Figure 4:
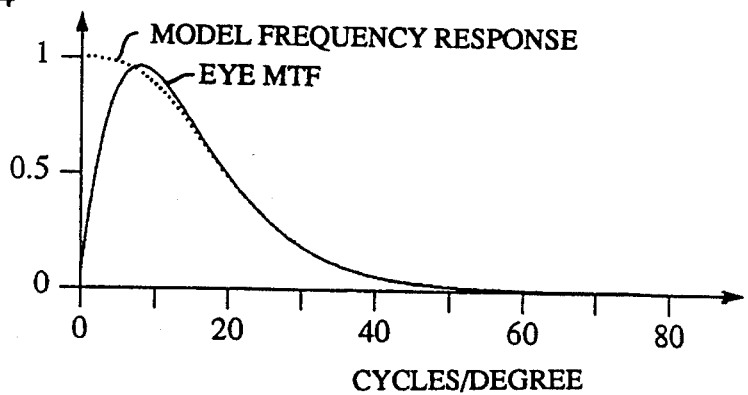
FIG. 4 presents by dotted line an illustrative frequency response for the FIR filter referenced in FIG. 3 (the solid line presents the characteristic of FIG. 1 for reference).

In many cases, practical considerations dictate a finite impulse response (FIR) filter for modeling eye characteristics. For example, a one-dimensional discrete-space model may take the form $$z_k = M(x_{k-m}, \ldots, x_{k+m}),\qquad(2)$$

where the $x_k$'s are samples of the color image (from one line or one column), the $z_k$'s are the model outputs (upon which cognition is based), and M(.) is a sliding-window function with 2m+1 arguments (m is a non-negative integer). Such a model can easily incorporate a memoryless nonlinearity and an FIR filter. Typical models that can be used are of the form $$z_k = n(x_k) * h_k,\qquad(3)$$

where n(.) is a memoryless nonlinearity, $h_{-m}, \ldots, h_m$ is the impulse response of an FIR filter and * denotes convolution. Also appropriate in some circumstances for the nonlinearity function 201 is $$n(x) = (x_1^{r_1}, x_2^{r_2}, x_3^{r_3})\qquad(4)$$

where $x_1, x_2, x_3$ are the color components of the image and $r_1, r_2, r_3$ are real numbers. For example, others have found $r_1 = r_2 = r_3 = \frac{1}{3}$ to be best. While it is advantageous to choose m as large as possible, a value of m=9 with a 19-th order FIR filter, whose frequency response approximately matched (1) for samples taken at 300 dots per inch and viewed at 30 inches, was found to involve a reasonable level of computational complexity for many applications. The impulse and frequency responses of the FIR filter are shown in FIGS. 3 and 4, respectively. In FIG. 4, the solid curve shows the eye MTF of FIG. 1 for comparison; $f_s = 1/\tau = 157.1$ cycles/degree. In FIG. 3, $\tau$ is equal to 0.0064 degrees.

A two-dimensional discrete-space model of the eye characteristics of the form $$z_{i,j} = M(x_{k,l}, (k,l) \in N_{i,j})\qquad(5)$$

may be used, where the $x_{k,l}$'s are color image samples, $N_{i,j}$ is a finite neighborhood of the site (i,j), the $z_{i,j}$'s are the model outputs (upon which cognition is based), and M(.) is a sliding-window function. Such a model can easily incorporate a memoryless nonlinearity followed by an FIR filter. Typical models that can be used are of the form $$z_{i,j} = n(x_{i,j}) * h_{i,j}\qquad(6)$$

where n(.) is a memoryless nonlinearity (same as in the one-dimensional case), $h_{i,j}$ is the impulse response of an FIR filter, and * denotes convolution. For samples taken at 300 dpi and viewed at 30 inches, the two-dimensional filter could be given by $h_{i,j} = h_i h_j$, where $h_k$ is the one-dimensional filter of FIGS. 3 and 4. More elaborate filters could be nonseparable and could account for the lower sensitivity of the eye to 45 degree sinusoids mentioned above.

B. The Printer Model

This section will introduce a framework for illustrative printer models for use in embodiments of the present invention and some specific models for color laser printers. While the teachings of the present invention may be applied to a variety of printer types, one illustrative printer for use with the present invention is the CANON CLC300 printer, which is an electrographic 400 dots per inch (dpi) printer. Another such illustrative printer is the QMS ColorScript 100 printer, which is a thermal 300 dpi printer.

To a first approximation, such printers are capable of producing colored spots (usually called dots) on a piece of paper, at any of the sites of a Cartesian grid with horizontal and vertical spacing of T inches. The reciprocal of T is generally referred to as the printer resolution in units of dpi.

Many color printers use ink of three colors: cyan (C), magenta (M), and yellow (Y). The printer is controlled by an $N_W \times N_H$ array of three-dimensional vectors with binary components. Each vector is of the form $$b_{i,j} = (b_{i,j}^C, b_{i,j}^M, b_{i,j}^Y) \; 1 \leq i \leq N_W, 1 \leq j \leq N_H,\qquad(7)$$

where $b_{i,j}^C = 1$ indicates that a cyan dot is to be placed at site (i,j) which is located iT inches from the top and jT inches from the left of the image, and $b_{i,j}^C = 0$ indicates that no cyan dot is to be placed at the site. The magenta $b_{i,j}^M$ and yellow $b_{i,j}^Y$ components are defined similarly. When $b_{i,j}^C = 0$, $b_{i,j}^M = 0$ and $b_{i,j}^Y = 0$ the site is to remain white. Such a white site is referred to as a white dot. When more than one component is equal to 1, then different inks are printed on top of each other to produce red, green, blue, or black dots (some printers use black ink to print a black dot instead of a combination of cyan, magenta, and yellow). Thus, $2^3 = 8$ different colors may be specified for each dot.

The colors cyan, magenta, and yellow form the basis for a subtractive system of colors. A halftone color image may also be specified by the additive colors red (R), green (G), and blue (B). In such a case, each vector is of the form $$a_{i,j}=(a_{i,j}^R, a_{i,j}^G, a_{i,j}^B) \quad 1 \leq i \leq N_W, 1 \leq j \leq N_H. \quad (8)$$

Here, $a_{i,j}^R=1$ indicates that the red component at site (i,j) is unblocked and $a_{i,j}^R=0$ indicates that the red component is zero. The other components are defined similarly. The transformation between the two representations is as follows, assuming ideal inks:

$$b_{i,j}^C = 1-a_{i,j}^R, \quad b_{i,j}^M = 1-a_{i,j}^G, \quad b_{i,j}^Y = 1-a_{i,j}^B, \quad (9)$$

and $$a_{i,j}^R = 1-b_{i,j}^C, \quad a_{i,j}^G = 1-b_{i,j}^M, \quad a_{i,j}^B = 1-b_{i,j}^Y. \quad (10)$$

The assumption of ideal inks means that cyan ink blocks 100% of the red component while blocking no green or blue; magenta ink blocks 100% of the green component and no red or blue; and yellow ink blocks 100% of the blue component and no red or green. The discussion of the illustrative embodiments of the invention below will be presented in the context of the additive system of colors (R,G,B). It will be understood by those of ordinary skill in the art, however, that the invention is applicable to other systems of specifying color, including the subtractive system discussed above.

Figure 5:
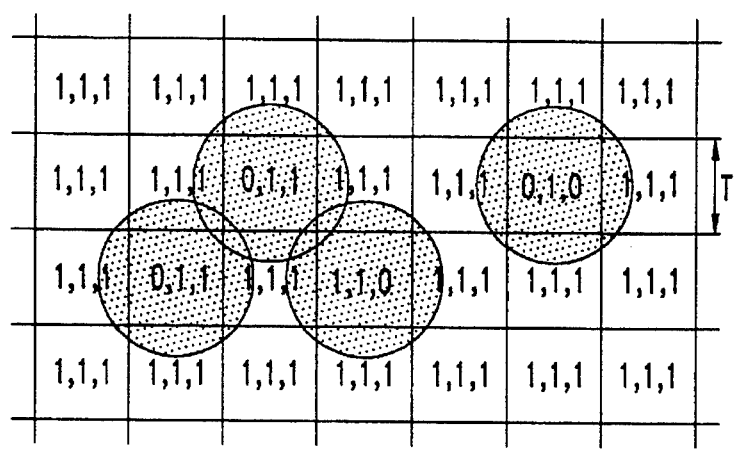
FIG. 5 presents printer ink dot overlap distortion.

The illustrative printers referenced above produce round rather than square dots. FIG. 5 illustrates the most significant cause of distortion introduced by most of such printers—dots which are larger than the minimal size needed to cover a site (i,j), as if ink spreading had occurred at the site. In this figure, each square represents a site (i,j). Each shaded circle represents a dot of ink. The color of the ink is indicated by the ordered triple within each site. So, for example, the triple 0,1,0 in the additive system indicates a green dot at the site ($a_{i,j}^G=1$), and no red or blue dots ($a_{i,j}^R=a_{i,j}^B=0$).

A variety of other printer distortions are also present, caused by heat finishing, reflections of light within paper, and other phenomena. Also, the inks may not be ideal. As a result, the color level produced by the printer at site (i,j) depends in some complicated way on $a_{i,j}$ and neighboring dots. However, due to the close spacing of dots and the limited spatial resolution of the eye, the color level can be modeled as having a constant value $p_{i,j}$ over site (i,j) equal to the average color level over the site.

A color printer model may therefore take the following form:

$$p_{i,j}=(p_{i,j}^R, p_{i,j}^G, p_{i,j}^B)=p(W_{i,j}) \quad 1 \leq i \leq N_W, 1 \leq j \leq N_H \quad (11)$$

where $W_{i,j}$ is a matrix or window of sites including $a_{i,j}$ and its surrounding neighbor cites (e.g., a 3×3 window of sites with $a_{i,j}$ at the center position), and where P, the printer model, is a function thereof. Thus, given the array $[a_{i,j}]$ that specifies a dot pattern to be printed, the printer model, P, generates a new array $[P_{i,j}]$ of color levels which has the same dimensions as the original dot array.

1. A Nonseparable Printer Model

Figure 6A:
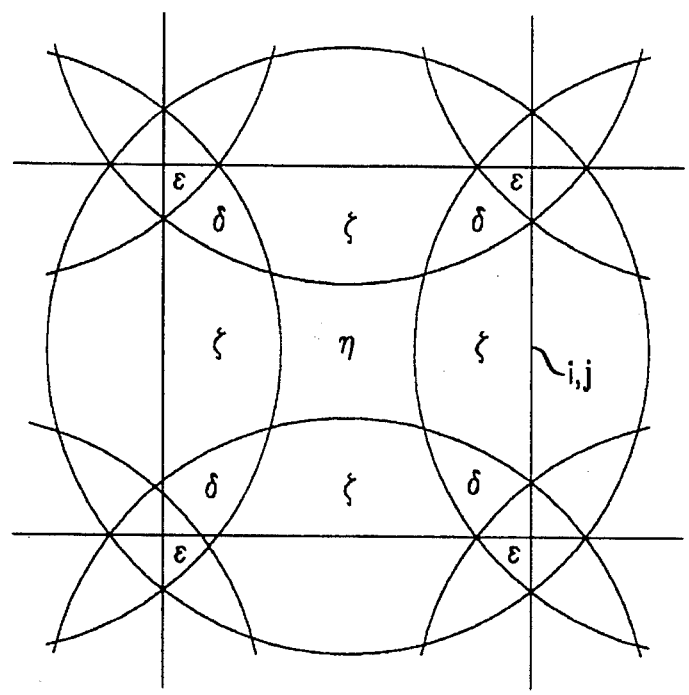
FIG. 6a presents the geometry of possible overlapping dots of ink at site (i,j) due to ink dots at site (i,J) and adjacent sites.

A printer model, P, is based on parameters related to the geometry and light absorption properties of overlapping color dots at adjacent sites on a printed page. The geometry is illustrated in FIG. 6a.

As shown in the Figure, a single square pixel site may include segments of different colors. Depending on the specification of color for the pixel and its eight neighbors, i.e., $W_{i,j}$, each segment of the pixel (i,j) can take any color produced by the presence of zero (no ink) or more ink spots (or pans thereof). If the color of each segment is known, the printer model, P, can specify the average color $p_{ij}$ in the RGB (additive) domain, for example, as a weighted sum of the colors of the different segments. The weight associated with each segment is equal to the area of the segment. This area may be calculated based on the parameters $\alpha$, $\beta$, and $\gamma$ shown in FIG. 7:

$$\epsilon=\beta, \quad \delta=65-\beta, \quad \zeta=\alpha-\Theta, \quad \eta=1-4\alpha+4\gamma. \quad (12)$$

Figure 7:
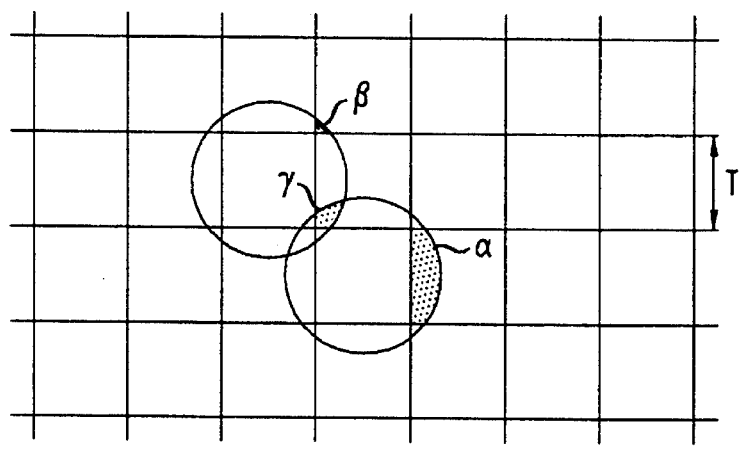
FIG. 7 presents a definition of parameters $\alpha$, $\beta$ and $\gamma$ for use with a printer model.

The parameters $\alpha$, $\beta$, and $\Theta$ are the ratios of the areas of the shaded regions shown in FIG. 7 to $T^2$. These parameters may be expressed in terms of $\rho$, a ratio of the actual dot radius to the ideal dot radius $T/\sqrt{2}$. For both the CANON and QMS printers discussed above, the actual dot size is close to the ideal, i.e., $\rho=1$, and $\alpha=0.143, \beta=0$, and $\gamma=0$.

Figure 6B:
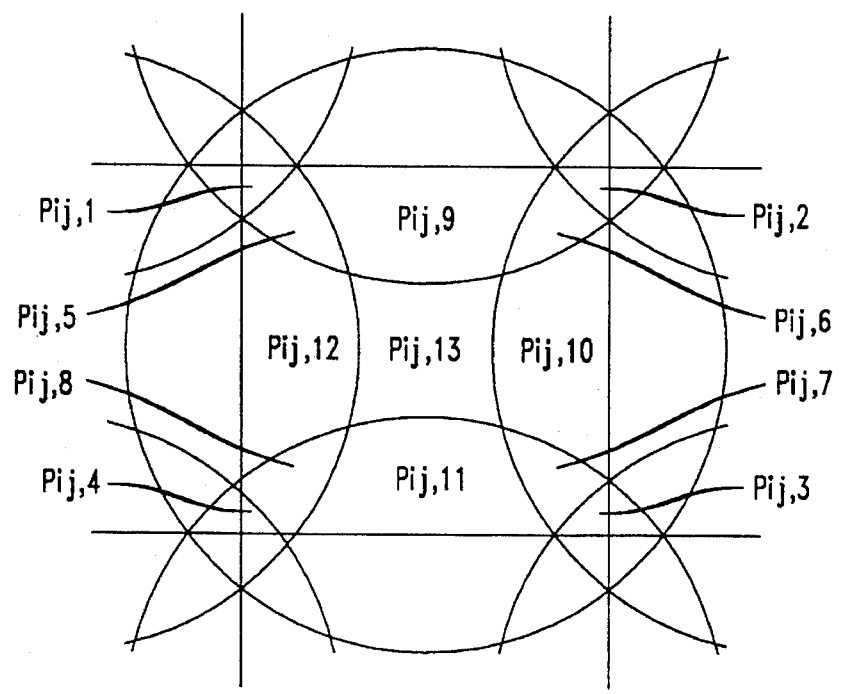

More specifically, the nonseparable model may be understood with reference to the following expressions and FIG. 6b:

$$p_{ij} = \sum_{k=1}^{13} p_{ij,k} \text{ area}(k) \quad (13)$$

where $$\begin{aligned} \text{area}(k) &= \epsilon & k &= 1,2,3,4 \\ \text{area}(k) &= \delta & k &= 5,6,7,8 \\ \text{area}(k) &= \zeta & k &= 9,10,11,12 \\ \text{area}(k) &= \eta & k &= 13 \end{aligned}$$

and $$p_{ij,1} = \text{printed\_color}(C,M,Y)$$

with $$\begin{aligned} C &= 1 & \text{if } a_{ij}^R = 0 \text{ or } a_{i-1,j}^R = 0 \text{ or } a_{i,j-1}^R = 0 \text{ or } a_{i-1,j-1}^R = 0 \\ M &= 1 & \text{if } a_{ij}^G = 0 \text{ or } a_{i-1,j}^G = 0 \text{ or } a_{i,j-1}^G = 0 \text{ or } a_{i-1,j-1}^G = 0 \\ Y &= 1 & \text{if } a_{ij}^B = 0 \text{ or } a_{i-1,j}^B = 0 \text{ or } a_{i,j-1}^B = 0 \text{ or } a_{i-1,j-1}^B = 0 \end{aligned}$$

$p_{ij,k}$ for $k = 2, 3, \ldots, 13$ are defined similarly.

The function printed—color (C, M, Y) can be determined based on the inks chosen, and its (R, G, B) components can be specified in a table, e.g.:

printed—color(1, 0, 0)=(0.10,0.88,0.92)

printed—color(0, 1, 0)=(0.90,0.05,0.90)

printed—color(1, 1, 0)=(0.09,0.04,0.89)

and so on for a total of 8 (i.e., $2^3$) arguments. The values of the printed—color function depend on, e.g., the ability of inks, either alone or in combination with other inks, to block certain colors.

This discussion illustrates a nonseparable printer model with a 3—3 window, $W_{i,j}$. It will be understood that printer models employing larger dimension windows may be derived in a similar fashion.

2. A Separable Printer Model

If the inks are assumed to be ideal, then the average color $p_{i,j}$ for the site (i,j) can be determined independently for each of the red, green, and blue components. Thus, Eq. (11) becomes:

$$P_{i,j}=(P_{i,j}^R, p_{i,j}^G, p_{i,j}^B)=(p^R(W_{i,j}^R), p^G(W_{i,j}^G), p^B(w_{i,j}^B)),$$

for $$1 \leq i \leq N_W, 1 \leq j \leq N_H), \quad (14)$$

where each of the color components is specified by a circular-dot-overlap model.

The circular dot overlap model predicts (or estimates) the percentage of color component (R, G, or B) light reflected from a printed pixel. For each color component, the model is defined as follows (presenting the model for the red component illustratively):

$$p_{i,j}^R = P^R(W_{i,j}^R) = \begin{cases} 0, & \text{if } a_{i,j}^R = 0 \\ 1 - f_1\alpha - f_2\beta + f_3\gamma, & \text{if } a_{i,j}^R = 1 \end{cases} \quad (15)$$

where $W_{i,j}^r$ denotes the window surrounding $a_{i,j}^R$, which includes $a_{i,j}^R$ and its eight neighbors. This window may be indexed as follows, using compass directions:

$$W_{i,j}^R = \begin{bmatrix} a_{nw}^R & a_n^R & a_{ne}^R \\ a_w^R & a_{ij}^R & a_e^R \\ a_{sw}^R & a_s^R & a_{se}^R \end{bmatrix} \quad (16)$$

Function $f_1$ is the number of horizontally and vertically neighboring dots whose red color component is zero (i.e., the number of zeros in the set $\{a_n^R, a_e^R, a_s^R, a_w^R\}$). Function $f_2$ is the number of diagonally neighboring dots (i.e., among $\{a_{nw}^R, a_{ne}^R, a_{se}^R, a_{sw}^R\}$) whose red color component is zero and not adjacent to any horizontally or vertically neighboring dot whose red color component is also zero. An example of a diagonally neighboring dot whose red color component is zero and that is not adjacent to any horizontally or vertically neighboring dot whose red component is also zero is $a_{nw}^R=0$ and $a_n^R a_w^R=1$. Function $f_3$ is the number of pairs of neighboring dots with zero red color component for which one is a horizontal neighbor and the other is a vertical neighbor of site (i,j) (e.g., $a_n^R=a_w^R=0$ would be one such pair).

The green (G) and blue (B) components are defined similarly to the red component discussed above with reference to equations (15) and (16).

In terms of $\rho$, the ratio of the actual dot radius to the ideal dot radius, the terms $\alpha$, $\beta$, and $\gamma$ may be expressed as follows:

$$\alpha = \frac{1}{4}\sqrt{2\rho^2 - 1} + \frac{\rho^2}{2}\sin^{-1}\left(\frac{1}{\sqrt{2r}}\right) - \frac{1}{2} \quad (17)$$

$$\beta = \frac{\pi\rho^2}{8} - \frac{\rho^2}{2}\sin^{-1}\left(\frac{1}{\sqrt{2r}}\right) - \frac{1}{4}\sqrt{2\rho^2 - 1} + \frac{1}{4} \quad (18)$$

$$\gamma = \frac{\rho^2}{2}\sin^{-1}\left(\frac{\sqrt{\rho^2-1}}{\rho^2}\right) - \frac{1}{2}\sqrt{\rho^2 - 1} - \beta \quad (19)$$

These expressions assume $1 \leq \rho \leq \sqrt{2}$; i.e., the color component dots are large enough to cover a T×T square, but not so large that dots separated (horizontally or vertically) by one white dot would overlap. The parameter $\alpha$, which is the largest of the three factors, represents the fraction of a horizontally or vertically neighboring site covered by a dot.

It should be noted that the model is not linear in the input bits, due to the fact that paper saturates at zero intensity for each color component.

This discussion illustrates a separable printer model with a 3×3 window, $W_{i,j}$. It will be understood that printer models employing larger dimension windows may be derived in a similar fashion.

C. Illustrative Embodiment Hardware

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. (Use of the term "processor" should not be construed to refer exclusively to hardware capable of executing software.) Illustrative embodiments may comprise digital signal processor (DSP) hardware, such as the AT&T DSP16 or DSP32C, and software performing the operations discussed below and conventional semiconductor memory (e.g., random access and read only memory). Very large scale integration (VLSI) hardware embodiments of the present invention, as well as hybrid DSP/VLSI embodiments, may also be provided.

Particular applications for printer model-based halftoning techniques of the present invention may use other implementing hardware and, where appropriate, software to suit the specific requirements of the application. For example, in a modification to a printer, the required processing can be accomplished by a microprocessor incorporated within the printer. Model information and the controlling software can conveniently be stored in read only memory units (ROMs).

II. Illustrative Embodiments of the Present Invention

Two illustrative embodiments of the present invention are presented below. The first incorporates a printer model in a color error diffusion halftoning process. The second incorporates a printer model in a color least-squares halftoning process.

A. Color Error Diffusion Model-Based Halftoning

In error diffusion halftoning, each image pixel is compared to a threshold which depends upon "prior" image pixels, usually pixels which are above and to the left of the pixel in question. Said another way, each image pixel is compared to a fixed threshold, after a correction factor is applied to its original color intensity to account for past errors.

Let $[x_{i,j}]$ be a two-dimensional continuous color tone image, where $$x_{i,j} = (x_{i,j}^R, x_{i,j}^G, x_{i,j}^B) \quad 1 \leq i \leq N_W, \ 1 \leq j \leq N_H \quad (20)$$

denotes a pixel located at the ith row and the jth column.

Image [x i,j] is the result of conventional scanning, and is processed left to right and top to bottom. Of course, other orderings are possible. As a result of the scanning process, image $[x_{i,j}]$ may comprise one pixel per dot to be generated. When the number of pixel samples of a given image are fewer than the number of dots to be generated, interpolation of the image is necessary. Interpolation may be provided by, e.g., conventional bilinear interpolation, or more sophisticated techniques, such as use of an expander coupled to an equiripple low-pass finite impulse response filter (see, e.g., Oppenheim and Schafer, *Discrete-Time Signal Processing*, Prentice Hall (1989) at p.107). The intensity of each color component of a pixel $x_{i,j}$ varies between 0 and 1.

An image $[a_{i,j}]$ produced by an error diffusion process responsive to a sampled image $[X_{i,j}]$ is obtained by signal processing in accordance with the following set of equations:

$$v_{i,j} = x_{i,j} - \sum_{m,n} h_{m,n} e_{i-m,j-n} \quad (21)$$

$$a_{i,j}^R = \begin{cases} 1, & \text{if } v_{ij}^R > T_{i,j}^R \\ 0, & \text{otherwise} \end{cases} \quad (22)$$

$$a_{i,j}^G = \begin{cases} 1, & \text{if } v_{ij}^G > T_{i,j}^G \\ 0, & \text{otherwise} \end{cases}$$

$$a_{i,j}^B = \begin{cases} 1, & \text{if } v_{ij}^B > T_{i,j}^B \\ 0, & \text{otherwise} \end{cases}$$

$$e_{i,j} = a_{i,j} - v_{i,j} \quad (23)$$

Here $v_{i,j}$ is the "corrected" continuous color tone image pixel. The error $e_{i,j}$ at any "instant" (i,j) is defined as the difference between the corrected image pixel $v_{i,j}$ and the halftone image pixel $a_{i,j}$. The "past" errors are low-pass filtered, color component by color component, and subtracted from the current image value $x_{i,j}$ before being compared to a threshold to obtain the halftone image pixel $a_{i,j}$. The impulse response of the low-pass filter is $[h_{i,j}]$. Thus, halftoning errors are "diffused" over the image.

Figure 8:
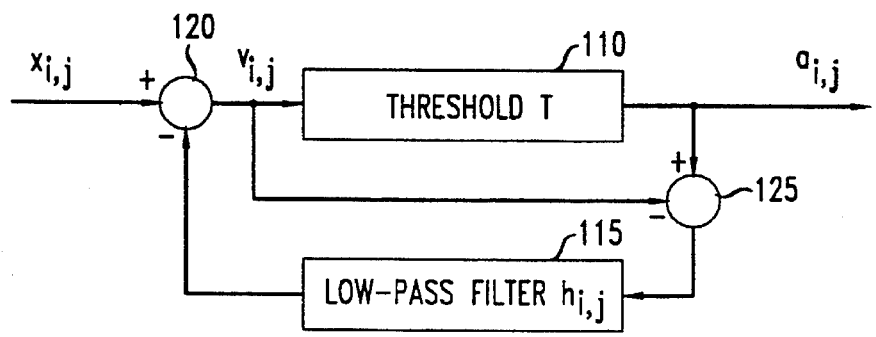
FIG. 8 presents a schematic diagram of conventional color error diffusion halftoning.

A diagram of conventional color error diffusion halftoning is shown in FIG. 8. Image $[x_{i,j}]$ is scanned left to right and top to bottom, i.e., starting at the top left and finishing at the lower right. Error diffusion halftoning usually requires only one pass through the image. The threshold $T_{i,j}^R$ represented by block 110 is illustratively fixed at a value, 0.5, which is the middle of the color intensity scale. The threshold for color components G and B may be similarly set. (As indicated by the subscripts and superscript, threshold T may be varied from site to site and from color to color.) Difference circuits are shown as 120 and 125 in the Figure. The low-pass filter 115 has an impulse response $[h_{i,j}]$. The filter has non-symmetric half-plane support (the two-dimensional equivalent of causality), and has positive coefficients which sum to one (to insure stability). That is, the effect of a "prior" pixel (to the left or above) can be accounted for, but a "future" pixel, not yet having occurred in the scan order, does not contribute to any error signal.

Various filters for use in error diffusion processes have been suggested in the literature. Illustrative of such filters is one proposed by Jarvis, Judice, and Ninke, *A Survey of Techniques for the Display of Continuous-Tone Pictures on Bilevel Displays*, 5 Comp. Graphics and Image Processing 13–40 (1976). The illustrative filter is characterized by Table 1.

TABLE 1

|  |  |  | $\frac{7}{48}$ | $\frac{5}{48}$ |
|---|---|---|---|---|
| $\frac{3}{48}$ | $\frac{5}{48}$ | $\frac{7}{48}$ | $\frac{5}{48}$ | $\frac{3}{48}$ |
| $\frac{1}{48}$ | $\frac{3}{48}$ | $\frac{5}{48}$ | $\frac{3}{48}$ | $\frac{1}{48}$ |

Figure 9:
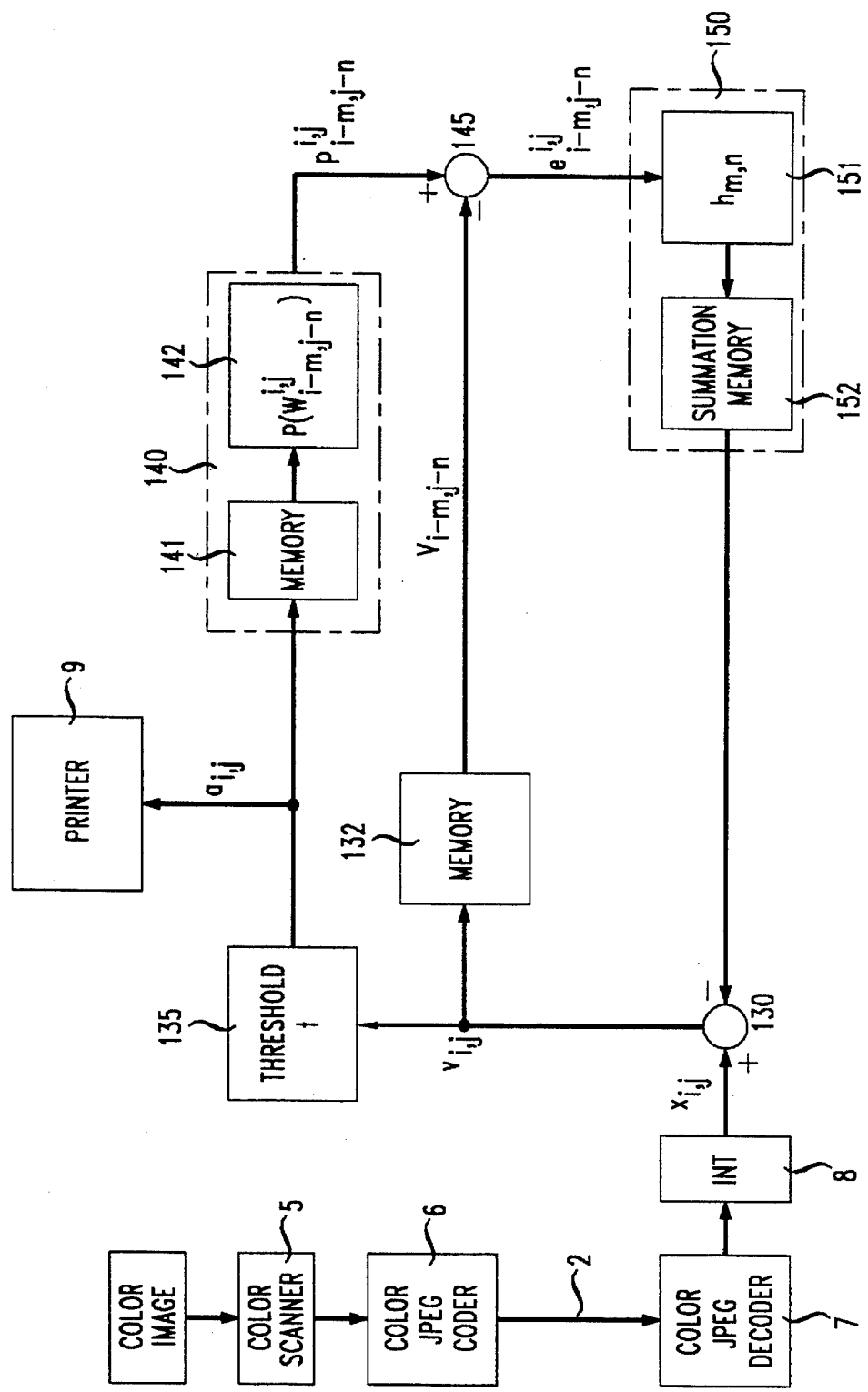
FIG. 9 presents an illustrative embodiment of the present invention concerning color error diffusion halftoning.

FIG. 9 presents an illustrative embodiment of the present invention as it concerns color error diffusion halftoning. An original continuous tone color image 1 is scanned by a conventional color scanner 5 at a transmitting location. Scanner 5 produces color pixels for coding by a conventional color coder 6, such as a JPEG coder. Coded color pixels from coder 6 are communicated via communication channel 2 to color decoder 7 (such as a JPEG decoder) at a receiving location. (For purposes of the illustrative embodiments of the present invention, a communication channel comprises any path for communicating information between devices or systems. Such a path may comprise a memory device or system, e.g., ROM or RAM; such a path may also comprise e.g., computer communication networks or buses; telecommunications networks (such as telephone networks), wireless communication links or networks, and the like.) The number of decoded color pixels is then adjusted by interpolation processor 8 (which operates in accordance with the discussion above) and provided to difference circuit 130. The balance of the Figure resembles FIG. 8 modified to show the use of a printer model 140, the coupling to an illustrative printer 9, and the use of memory 132 for storage of past corrected color image values and memories 141 and 152 within printer model 140 and low-pass filter 150, respectively. Element 151 provides the low-pass filtering as referenced above employing the coefficients of Table 1. It will be understood by those skilled in the art that different particular filtering coefficients may be used.

Note that the output of the thresholding processor 135, i.e., the actual color binary pattern sent to the printer, is not used to generate the error signal to be fed back to modify the input values before submitting them to the thresholding processor. Rather, a modified version of the binary pattern processed in accordance with printer model 140, and reflecting the particular characteristics of the printer, is used as the feedback sequence.

The printer model 140 may realized in accordance with expressions (14–19) or (12–13) by employing conventional semiconductor memory and DSP hardware referenced above. Each error signal $e_{m,n}^{i,j}$ is defined as the difference between the "corrected" color image pixel, $V_{m,n}$, and the output of the printer model 140. Thus the illustrative embodiment accounts for printer distortions as well as quantization effects.

The embodiment of FIG. 9 operates in accordance with the following expressions:

$$v_{i,j} = x_{i,j} - \sum_{m,n} h_{m,n} e_{i-m,j-n}^{i,j} \quad (24)$$

$$a_{i,j}^R = \begin{cases} 1, & \text{if } v_{ij}^R > T_{i,j}^R \\ 0, & \text{otherwise} \end{cases}$$

-continued $$a_{i,j}^G = \begin{cases} 1, & \text{if } v_{ij}^G > T_{i,j}^G \\ 0, & \text{otherwise} \end{cases} \quad (25)$$

$$a_{i,j}^B = \begin{cases} 1, & \text{if } v_{ij}^B > T_{i,j}^B \\ 0, & \text{otherwise} \end{cases}$$

$$e_{m,n}^{i,j} = p_{m,n}^{i,j} - v_{m,n} \quad \text{for } (m,n) < (i,j) \quad (26)$$

where (m,n)<(i,j) means (m,n) precedes (i,j) in the scanning order, and $$p_{m,n}^{i,j} = p(W_{m,n}^{i,j}) \text{ for } (m,n)<(i,j) \quad (27)$$

where $W_{m,n}^{i,j}$ is a matrix of $a_{m,n}$ and its neighbors, but here the neighbors $a_{k,l}$ have been determined only for (k,l)<(i,j); they are taken to be one for (k,l)≧(i,j). (In a multipass implementation of error diffusion halftoning, the neighbors $a_{k,l}$ for (k,l)≧(i,j) may assume values obtained in a previous pass.) Since only the dot-overlap contributions of the "past" pixels can be used in (27), the "past" errors keep getting updated as more binary values are computed. Hence both the past errors and the printer model outputs are dependent on the "instant" (i,j).

It should be understood that the impulse response $h_{m,n}$ in equation (24) may be different for each color component.

Illustratively, difference circuit 130 and low-pass filter 150 realize the signal processing indicated by equation (24). Threshold circuit 135 realizes the thresholding operations indicated by equation (25). Finally, difference circuit 145 and printer model 140 realize the operations indicated by equations (26) and (27). Thresholding circuit 135, low-pass filter 150 and printer model 140 may be implemented with DSP hardware programmed to carry out the signal processing specified by the associated equations referenced above.

Regarding the operation of the embodiment of FIG. 9, a given signal $x_{i,j}$ is received by difference element 130. Element 130 forms a modified or corrected input signal, $v_{i,j}$, by subtracting a correction signal (produced by low-pass filter 150) from the input signal, $x_{i,j}$. The correction signal produced by the low-pass filter 150 reflects one or more past error signals, $e_{i-m,j-n}^{i,j}$, in the manner of expression (21) (the superscript i,j indicates the location of the current input signal; subscripts i–m and j–n refer to past locations). The past error signals reflect differences between past modified input signals, $v_{i-m,j-n}$, and past signals predictive of regions of halftone images formed by a display device, $p_{i-m,j-n}^{i,j}$. Therefore, a "current" modified input signal, $v_{i,j}$, is based upon the difference between a current input signal, $x_{i,j}$, and a weighted sum of past error signals, $e_{i-m,j-n}^{i,j}$ (according to (21).

Each current modified input signal is provided to threshold function 135. The threshold function 135 produces a signal, $a_{i,j}$, in accordance with equation (25). Signal $a_{i,j}$ forms the binary pattern (or halftone image) which is supplied to a display device, such as a printer 9.

Signal $a_{i,j}$ is also supplied to printer model 140. Printer model 140 stores these signals in memory 141 for use in modeling or predicting the color of site i–m,j–n of an image produced by the printer. Predicted color level signals are indicated in FIG. 9 as the output of printer model 140, $p_{i-m,j-n}^{i,j}$.

The predicted signals, $P_{i-m,j-n}^{i,j}$ are provided to difference element or circuit 145. Difference circuit 145 subtracts past modified input signals, $V_{i-m,j-n}$, stored in memory 132 referenced above, from $p_{i-m,j-n}^{i,j}$ to yield an estimate of color level error, $e_{i-m,j-n}^{i,j}$. Because of the use of printer model 140 to form $p_{i-m,j-n}^{i,j}$, the color level error, $e_{i-m,j-n}^{i,j}$, takes into account distortions introduced by the printer when producing a printed color image (in response to past binary signals stored in memory 141). Color level error is then provided to the low-pass filter 150 where it is used in the formation of a correction signal for an input signal. Filter 150 includes summation 152 memory to form the convolution sum of equation (21).

It should be understood that the above description of the operation of the apparatus of FIG. 9 is but a single step in a recursive process. Like conventional error diffusion halftoning presented illustratively in FIG. 8, the operation of the embodiment of the present invention shown in FIG. 9 is properly understood in a recursive context.

Assuming use of a separable printer model, equation (27) and therefore (26) may be realized separably, i.e., on a component by component basis. Since equations (24) and (25) are separable, the illustrative error diffusion process presented in FIG. 9 may be implemented independently for each color component in accordance with equations (14)–(19). Such independent implementation may be advantageously applied in parallel or pipelined hardware architectures. In the case of a parallel architecture, the embodiment of FIG. 9, with vectors replaced by scalars representing a color component (e.g., $v_{ij} \to v_{ij}^R$) may be implemented three times, each implementation operating simultaneously to handle a separate color component. In the case of a pipelined architecture, the embodiment of FIG. 9 with vectors replaced by scalars representing one color component (e.g., $v_{ij} \to v_{ij}^R$) may be exercised in three successive processing intervals, each processing interval performing all processing associated with a given one of three color components. Of course, a nonseparable printer model, such as that discussed above, may also be employed in an embodiment of the invention.

Listing 1 is a sample computer program in the well-known C Language which, when executed on a typical general purpose computer, e.g., the Spark Station Model 1+ processor marketed by Sun Microsystems, will perform the processing shown in FIG. 9 and described above. Listing 1 incorporates a separable printer model. The listing assumes that the input values for the sampled color image, [$X_{i,j}$], have been stored in the processor's memory as have the low pass filter values and other needed data and programs. Those skilled in the art will adapt the procedures in Listing 1 to particular other computers and languages as needed. The output to the printer is, as in all cases described herein, the values for $a_{i,j}$.

B. Color Least-Squares Model-Based Halftoning

Least-squares model-based (LSMB) halftoning is a process which seeks to minimize a squared error signal formed based on a difference between (i) the output signal of a cascade of printer and visual models in response to a halftone image input signal and (ii) the output signal of a visual model which has processed an original continuous tone color image signal. In an iterative embodiment, the error signal can be used as a basis for the modification of the halftone image input signal. The modified input signal is then provided to the iterative process for further modification.

Figure 10:
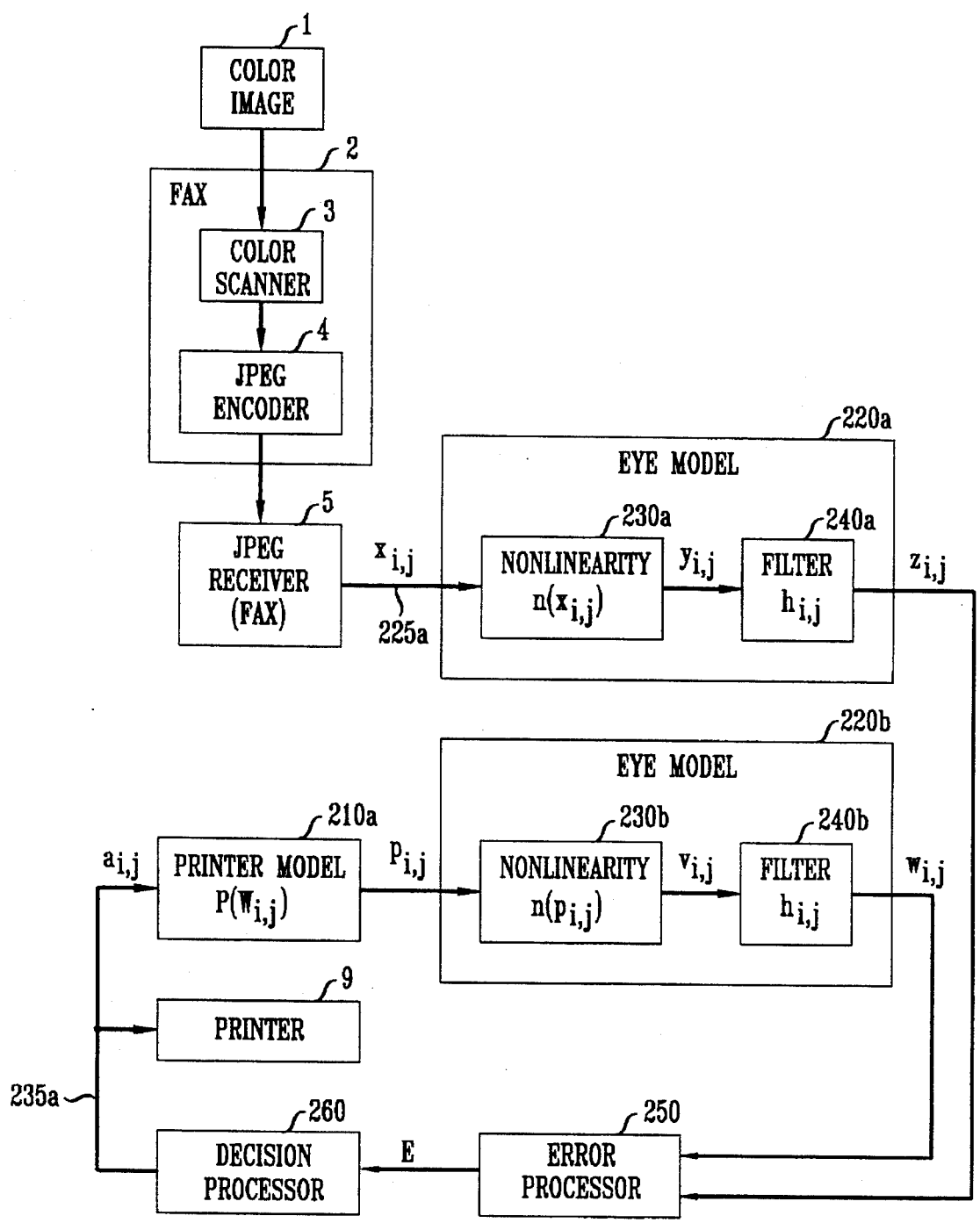
FIG. 10 presents an illustrative embodiment of the present invention concerning color least-squares model-based halftoning.

An illustrative embodiment of the present invention employing LSMB halftoning is presented in FIG. 10. The Figure presents a color image facsimile transmission system coupled to a least-squares model-based halftoning printing system.

As shown in the Figure, a color image 1 is scanned by the scanner 3 of a transmitting color facsimile system 2. A continuous color tone coder 4 (such as, e.g., a conventional JPEG coder) encodes the scanned image for transmission to a color tone receiver 5 (again, e.g., JPEG via a communication channel). A continuous-tone color image signal for halftoning, $[x_{i,j}]$, is provided as an output of receiver 5. Image $[X_{i,j}]$ comprises one pixel per printable dot to be generated (interpolation may be provided, as discussed above). This image is provided as input to a visual or "eye" filter 220a on line 225a. Filter 220a comprises a nonlinearity processor 230a and a finite impulse response (FIR) filter having an impulse response, $[h'_{i,j}]$. Filter 220a produces output image samples, $z_{i,j}$, in accordance with the following expression:

$$z_{i,j} = n(x_{i,j}) * h'_{i,j} \qquad (28)$$

where "*" indicates convolution and n is a nonlinearity 230a as discussed above. It should be understood that the eye filter 220a need operate on image $[x_{i,j}]$ only once. This is because image $[z_{i,j}]$ used by the embodiment does not change during the illustrative iterative least-squares process.

As further shown in the Figure, signals forming a halftoned image, $[a_{i,j}]$, are provided to a printer model 210a. This halftoned image may comprise an initial halftoned image, or an intermediate or final result of the least-squares process of the embodiment. For purposes of the embodiment, the initial halftone image may be any image, e.g., an image of dots of one color only, or all black or white dots. This initial image may also comprise the output of any halftoning process, such as color error diffusion halftoning discussed above. Advantageously, multipass error diffusion halftoning may be used for this purpose.

The printer model 210a operates in accordance with expressions (12)–(13) or (14–19) presented above. As such, the model provides as output an image $[p_{i,j}]$ comprising signals forming an estimate of the output of a printer represented by the model. Image $[p_{i,j}]$ is provided as an input to a second eye filter 220b.

Filter 220b comprises a nonlinearity processor 230b coupled to an FIR filter 240b having an impulse response $[h_{i,j}]$. The output of filter 220b is an image, $[W_{i,j}]$, which is determined in accordance with the following expression:

$$w_{i,j} = n(P_{i,j}) * h_{i,j}, \qquad (29)$$

where "*" again indicates convolution and n is a nonlinearity 230b.

In illustrative embodiments of the present invention, eye filters 220a and 220b may be realized in identical fashion, including identical separable, two-dimensional FIR filters. Their impulse responses, $[h'_{i,j}]$ and $[h_{i,j}]$, respectively, may be obtained by the product of one-dimensional approximations to the eye MTF, as presented in FIGS. 3 and 4. It should be understood, however, that eye filters 220a and 220b may be realized in other forms, such as, e.g., filters excluding the nonlinearity processors. Furthermore, the impulse responses need not be equal. Moreover, in some cases, it may be advantageous to omit filtering the image $[x_{ij}]$ by the eye model 220a, i.e., to set $[z_{ij}] = [x_{ij}]$. This may effect sharper halftoned images.

Image signals $[z_{i,j}]$ and $[w_{i,j}]$ are provided to an error processor 250. Processor 250 determines an error signal based on these image signals. This error signal is provided to a decision processor 260 which operates to modify the halftone image sample, $[a_{i,j}]$, so as to reduce the error signal determined by processor 250 subsequently. Printer model 210a, eye filter 220b, error processor 250, and decision processor 260 operate iteratively to provide halftoned image approximation $[a_{i,j}]$ to original image $[x_{i,j}]$. The iterative process ends when image $[a_{i,j}]$ satisfies an error criterion as determined by the decision processor 260.

Illustratively, processor 260 determines that image $[a_{i,j}]$ which minimizes a squared error $$E = \sum_{i=0}^{N_W-1} \sum_{j=0}^{N_H-1} |z_{i,j} - w_{i,j}|^2 \qquad (30)$$

where, as illustrated in FIG. 10, $$\begin{aligned}
z_{i,j} &= y_{i,j} * h_{i,j}' = n(x_{i,j}) * h_{i,j}'; \\
w_{i,j} &= v_{i,j} * h_{i,j} = n(p_{i,j}) * h_{i,j}; \\
p_{i,j} &= (p^R_{i,j}, p^G_{i,j}, p^B_{i,j}) = P(W_{i,j}); \\
z_{i,j} &= (z^R_{i,j}, z^G_{i,j}, z^B_{i,j}); \\
y_{i,j} &= (y^R_{i,j}, y^G_{i,j}, y^B_{i,j}); \\
x_{i,j} &= (x^R_{i,j}, x^G_{i,j}, x^B_{i,j}); \text{ and} \\
v_{i,j} &= (v^R_{i,j}, v^G_{i,j}, v^B_{i,j}),
\end{aligned} \qquad (31)$$

and where $\|.\|^2 = (.^R)^2 + (.^G)^2 + (.^B)^2$. Again, * indicates convolution. The boundary conditions are:

$$a_{i,j}^{R,G,B} = 1 \text{ for } i<1, i>N_W, j<1, j>N_H$$

$$x_{i,j}^{R,G,B} = 1 \text{ for } i<1, i>N_W, j<1, j>N_H \qquad (32)$$

These boundary conditions provide that no ink is placed outside the image borders.

It should be understood that the impulse responses $h_{m,n}$ n and $h'_{m,n}$ in equations (28), (29), and (31) may be different for each color component.

A two-dimensional least squares solution to Eq. (30) may be obtained by iterative techniques. In an illustrative iterative technique, given an initial estimate of $[a_{i,j}]$, for each image site (i,j) (in some fixed or random order, usually a raster scan), decision processor 260 determines the pixel $a_{i,j}$ that minimizes the squared error:

$$E_{i,j} = \sum_{k=i-\lambda}^{i+\lambda} \sum_{l=j-\mu}^{j+\mu} |z_{k,l} - w_{k,l}|^2, \qquad (33)$$

where $\lambda$ and $\mu$ are integers which define an area within the image $[a_{i,j}]$. It is preferred that $\lambda = \mu = 0$. An iteration is complete when the minimization is performed for each color component at each image site.

So, for example, for image site (i,j), processor 260 determines which of the eight possible values of $a_{i,j}$ provides the smaller error (as determined by processor 250) within the image area defined by $\lambda$ and $\mu$. Decision processor 260 then chooses this value for $a_{i,j}$. A few iterations (typically, 5–10) are sufficient. Convergence of the process may be deemed to occur when a normalized difference in an error measure, e.g., equation 30, for consecutive iterations falls below a threshold, as determined by processor 260. When the starting point is the modified error diffusion result, even fewer iterations are required. The images produced using the above method are only local minima of the least-squares problem. There could in fact be several local minima for a given image, depending on the starting point. Once convergence has been determined, image $[a_{i,j}]$ is ready to be printed by printer 9.

In a variation of the above iterative technique, given an initial estimate of the halftoned image $[a_{i,j}]$, for every image site (i,j) (in some fixed or random order, usually a raster scan), the values $a_{k,l}$ for $k=i-i_1, \ldots, i+i_2; l=j-j_1, \ldots, j+j_2$ are chosen so as to minimize the squared error:

$$E_{i,j} = \sum_{k=i-i_1-\lambda}^{i+i_2+\lambda} \sum_{l=j-j_1-\mu}^{j+j_2+\mu} z_{k,l} - w_{k,l}^2 \qquad (34)$$

where $\lambda,\mu,i_1,i_2,j_1,j_2$ are given integers. Again, it is preferred that $\lambda=\mu=0$. The amount of computation doubles with each increment in one of the integers $i_1,i_2,j_1,j_2$. A few iterations (typically, 3–5) are required for convergence.

It should be understood that other iterative and non-iterative techniques may be employed to minimize the error function of equation 30.

Assuming use of a separable printer model and a separable nonlinearity e.g., as in equation (4), the three components in the third equation in (31) become independent and therefore the minimization of equation (30) may be realized separably for each color component. In such a case, the embodiment of FIG. 10 may be implemented independently for each color component in a fashion similar to that discussed above with reference to the separable error diffusion process.

Listing 2 is a sample computer program in the C Language which, when executed on a typical general purpose computer, e.g., the Spark Station Model 1+processor marked by Sun Microsystems, will perform the processing shown in FIG. 10 and described above. Listing 2 incorporates a separable printer model. The listing assumes that the input values for the sampled color image, $[x_{i,j}]$, have been stored in the processed memory, as have the low-pass filter values and other needed data and programs. Those skilled in the an will adapt the procedures in Listing 2 to particular other computers and languages as needed. The output to the printer is, as in all cases described herein, the values for $a_{i,j}$.

It should be understood that the above-described models, window sizes, filter coefficients and other system and method parameters are merely illustrative. Other particular printer (and eye) models may prove advantageous in particular circumstances, as will be apparent to those skilled in the art.

While it has been assumed that the printer parameters are fixed and known in advance before any of the processing described above, no such limitation is essential to the present invention. That is, it is advantageous in some circumstances to adjust the printer model to account for changes in printer parameters, e.g., over time. In particular, it is possible to sense printer parameters such as dot size or shape as part of the printing process. Alternatively, such sensing can be accomplished, as required, separately from the actual printing process, i.e., off-line. After such sensing, the processing can incorporate the new printer parameters in an future halftoning operations.

LISTING 1

```c
/*
 *
 *       ***********************************************
 *       *            Copyright (c) 1992 AT&T          *
 *       *            All Rights Reserved              *
 *       ***********************************************
 *
 * AUTHOR: THRASYVOULOS N. PAPPAS
 *
 * MODIFIED ERROR DIFFUSION HALFTONING OF A COLOR (OR GRAY-SCALE) IMAGE
 * USES 3 X 3 PRINTER MODEL (SEPARABLE COLOR OR GRAY-SCALE)
 *
 * ASSUMES IMAGE HAS ALREADY BEEN INTERPOLATED TO DESIRED RESOLUTION.
 *
 * INPUT IMAGE IS IN "PICFILE" FORMAT ("RGB" OR "BW" FORMAT).
 * OUTPUT IMAGE IS "BITMAP" CLASS IN "PICFILE" FORMAT.
 *
 *       flag=1: FLOYD AND STEINBERG FILTER
 *       flag=2: JARVIS, JUDICE AND NINKE FILTER
 *               (STUCKI FILTER DEFINED SIMILARLY)
 *
 *       DOT-OVERLAP PARAMETER: rho [1.0]
 *
 *                   1.0 <= rho <= 1.414
 *
 *       niter: NUMBER OF ITERATIONS (NORMALY 1).
 *
 */ define usage() fprintf(stderr,\
 "usage: mod_err_diff [-i input] [-o output]           \
\n                    [-f flag] [-a rho] [-n niter]    \
\n");

#include <math.h>
#include <stdio.h>
#include <signals.h>
define PI 3.141592653589793 main(argc, argv)
int argc;
char *argv[];
{
    float       blue1(), blue2();
    void        inkparam(), move_er(), win_er();
    int         hh, ww, hhh, www, bh, bw, bhh;
    int         i, j, flag, n, niter;
    int         k, nchan;
    float       alfa, gama, beta, rho;
    Signal      *ptsigim;   /* points to input image Signal */
    Signal      *ptsigou;   /* points to image Signal */
    Signal      *ptsigyy;   /* points to image Signal */
    Signal      *ptsiger;   /* points to image Signal */
    Signal      *ptsigvv;   /* points to image Signal */
    Signal      *ptsigbb;   /* points to output image Signal */
    unsigned char *ptim;    /* points to input image data */
    unsigned char *ptou;    /* points to image data */
    unsigned char *ptyy;    /* points to image data */
    float       *pter;      /* points to image data */
    float       *ptvv;      /* points to image data */
    unsigned char *ptbb;    /* points to output image data */
    char        buf1[200], buf2[200];

sprintf(buf1,"play.pic");   /* default infile (picfile) */
    sprintf(buf2,"junk");       /* default outfile (picfile) */
```

```
flag = 2;                      /* default flag */
rho = 1.0;                     /* default ink spreading ratio */
niter = 1;                     /* default number of iterations */ while(argc-- > 1)
    if(argv[argc][0] == '-')
        switch(argv[argc][1])
        {
            case 'u':
                usage();
                exit(-1);
            case 'i':
                sprintf(buf1,"%s",argv[argc+1]);
                break;
            case 'o':
                sprintf(buf2,"%s",argv[argc+1]);
                break;
            case 'f':
                sscanf(argv[argc+1],"%d",&flag);
                break;
            case 'a':
                sscanf(argv[argc+1],"%f",&rho);
                break;
            case 'n':
                sscanf(argv[argc+1],"%d",&niter);
                break;
            default:
                break;
        } if(rho < 1.0 || rho > 1.414)
{
    printf("Error in printer parameter specification\n");
    exit(-1);
}
else
    inkparam(rho,&alfa,&beta,&gama);

if((ptsigim = SigOpen_r(buf1,LINE)) == NullSignal)
{
    printf("Error in opening Signal file for image\n");
    exit(-1);
} if(CheckFormat(ptsigim,UCHAR) == 0) exit(-1);

hh = SignalHeight(ptsigim,0);
ww = SignalWidth(ptsigim,0);

nchan = SignalChannels(ptsigim);

if((ptsigou = NewBitmapSignal("out",ww,hh,SignalColorspace(ptsigim),
                              LINE)) == NullSignal)
{
    printf("Error in creating Signal for the output image\n");
    exit(-1);
} copy_argv(ptsigim,ptsigou);
History(ptsigou,argv);

if(flag == 1)
{
    bh = 1;
    bw = 1;
}
```

```
else
{
    bh = 2;
    bw = 2;
} bhh = bh+1;

hhh = hh+2*bh;
www = ww+2*bw;

if(SignalColorspace(ptsigim) == RGBCS)
{
    if((ptsigyy = NewRgbSignal("dummy",UCHAR,www,hhh,
                                FULLIMAGE)) == NullSignal)
    {
        printf("Error in creating Signal for bordered image\n");
        exit(-1);
    } if((ptsigbb = NewRgbSignal("dummy",UCHAR,www,hhh,
                                FULLIMAGE)) == NullSignal)
    {
        printf("Error in creating Signal for output image\n");
        exit(-1);
    }
}
else if(SignalColorspace(ptsigim) == BWCS)
{
    if((ptsigyy = NewBwSignal("dummy",UCHAR,www,hhh,
                                FULLIMAGE)) == NullSignal)
    {
        printf("Error in creating Signal for bordered image\n");
        exit(-1);
    } if((ptsigbb = NewBwSignal("dummy",UCHAR,www,hhh,
                                FULLIMAGE)) == NullSignal)
    {
        printf("Error in creating Signal for output image\n");
        exit(-1);
    }
}
else
{
    printf("Input signal types not B&W, RGB, or BITMAP\n");
    exit(-1);
} if((ptsiger = NewBwSignal("dummy",FLOAT,www,bhh,
                            FULLIMAGE)) == NullSignal)
{
    printf("Error in creating Signal for error image\n");
    exit(-1);
} if((ptsigvv = NewBwSignal("dummy",FLOAT,www,bhh,
                            FULLIMAGE)) == NullSignal)
{
    printf("Error in creating Signal for ink image\n");
    exit(-1);
} for(j = 0; j < hhh; j++)
{
    if(j < bh || j >= hhh-bh)
```

```
            {
                for(k = 0; k < nchan; k++)
                {
                    ptyy = SignalData(ptsigyy,k).uc+j*www;

for(i = 0; i < www; i++)
                        *ptyy++ = 255;
                }
            }
            else
            {
                if(!SigRead(ptsigim))
                {
                    sigerror("Error in reading signal %s row %d\n",
                            SignalName(ptsigim),ReadLocation(ptsigim));
                    exit(-1);
                } for(k = 0; k < nchan; k++)
                {
                    ptyy = SignalData(ptsigyy,k).uc+j*www;
                    ptim = SignalData(ptsigim,k).uc;

for(i = 0; i < www; i++)
                    {
                        if(i < bw || i >= www-bw)
                            *ptyy++ = 255;
                        else
                            *ptyy++ = *ptim++;
                    }
                }
            }
    }

DestroySignal(ptsigim);

for(j = 0; j < hhh; j++)
    {
        for(k = 0; k < nchan; k++)
        {
            ptbb = SignalData(ptsigbb,k).uc;

for(i = 0; i < www; i++)
                *ptbb++ = 0;
        }
    } for(k = 0; k < nchan; k++)
    {
        pter = SignalData(ptsiger,0).f;

for(j = 0; j < bhh; j++)
            for(i = 0; i < www; i++)
                *pter++ = 0.;

for(n = 0; n < niter; n++)
        {
            fprintf(stderr," n=%d",n);

ptyy = SignalData(ptsigyy,k).uc;
            ptbb = SignalData(ptsigbb,k).uc;

for(j = 0; j < hhh; j++)
            {
                ptvv = SignalData(ptsigvv,0).f+bh*www;
                pter = SignalData(ptsiger,0).f+bh*www;
```

```
            move_er(ptvv,pter,www,hhh,bh);

for(i = 0; i < www; i++)
            {
                float pixvv;
                int   pixou;

if(j < bh || j >= hhh-bh || i < bw || i >= www-bw)
                {
                    ptbb++;
                    pter++;
                    ptvv++;
                    ptyy++;
                    continue;
                } pixvv = *ptyy;

if(flag == 1) pixvv -= blue1(pter,www,i,j,bh,bw);
                if(flag == 2) pixvv -= blue2(pter,www,i,j,bh,bw);

pixou = (pixvv < 128 ? 0 : 255);

if(pixou == 255) *ptbb = 0;
                else             *ptbb = 1;

*ptvv = pixvv;

win_er(ptbb,ptvv,pter,www,hhh,alfa,beta,gama);

ptbb++;
                ptvv++;
                pter++;
                ptyy++;
            }
        }
    }
    fprintf(stderr,"\n");
}

DestroySignal(ptsigvv);
DestroySignal(ptsiger);
DestroySignal(ptsigyy);

if(!SigOpen_w(ptsigou,buf2))
{
    sigerror("Error in opening output signal %s\n",buf2);
    exit(-1);
} for(j = bh; j < hhh-bh; j++)
{
    for(k = 0; k < nchan; k++)
    {
        ptbb = SignalData(ptsigbb,k).uc+j*www;
        ptou = SignalData(ptsigou,k).uc;

for(i = 0; i < www; i++)
        {
            if(i < bw || i >= www-bw)
            {
                ptbb++;
            }
            else
            {
```

```
                    *ptou = 255*(1 - *ptbb);

ptou++; ptbb++;
                }
            }
        } if(!SigWrite(ptsigou))
        {
            sigerror("Error in writing signal %s row %d\n",
                    SignalName(ptsigou),ReadLocation(ptsigou));
            exit(-1);
        }
    }

/*******************************************/ printf("\n:::::::   mod_err_diff:\n");

printf("\n  image in : %s\n",buf1);
    printf("  image out: %s\n",buf2);
    printf("\n  height = %d    width = %d\n",hh,ww);
    printf("\n  dor overlap: rho  = %.3f\n",rho);
    printf("\n  %d iterations\n",niter);

printf("\n");

exit(0);
} float blue1(pter,ww,i,j,bh,bw)
int    ww,i,j,bh,bw;
float *pter;
{
/*
 * Floyd and Steinberg;
 *
 * pter: pointer to current error pixel (error image: hh X ww )
 *
 */ float  flterr, cons;

cons = 0.;

if(j > bh) cons += 5;
    if(i > bw)
    {
        cons += 7;
        if(j > bh) cons += 1;
    }
    if(i < ww-bw-1 && j > bh) cons += 3;

flterr = 0.;

if(j > bh) flterr += *(pter-ww)*(5/cons);
    if(i > bw)
    {
        flterr += *(pter-1)*(7/cons);
        if(j > bh) flterr += *(pter-ww-1)/cons;
    }
    if(i < ww-bw-1 && j > bh) flterr += *(pter-ww+1)*(3/cons);

return(flterr);
}
```

```
float blue2(pter,ww,i,j,bh,bw)
int    ww,i,j,bh,bw;
float *pter;
{
/*
 * Jarvis, Judice and Ninke;
 *
 * pter: pointer to current error pixel (error image: hh X ww )
 *
 */ float  flterr, cons;

cons = 0.;

if(j > bh) cons += 7;
    if(j > bh+1) cons += 5;
    if(i > bw)
    {
        cons += 7;
        if(j > bh) cons += 5;
        if(j > bh+1) cons += 3;
    }
    if(i > bw+1)
    {
        cons += 5;
        if(j > bh) cons += 3;
        if(j > bh+1) cons += 1;
    }
    if(i < ww-bw-1)
    {
        if(j > bh) cons += 5;
        if(j > bh+1) cons += 3;
    }
    if(i < ww-bw-2)
    {
        if(j > bh) cons += 3;
        if(j > bh+1) cons += 1;
    } flterr = 0.;

if(j > bh) flterr += *(pter-ww)*(7/cons);
    if(j > bh+1) flterr += *(pter-ww-ww)*(5/cons);
    if(i > bw)
    {
        flterr += *(pter-1)*(7/cons);
        if(j > bh) flterr += *(pter-ww-1)*(5/cons);
        if(j > bh+1) flterr += *(pter-ww-ww-1)*(3/cons);
    }
    if(i > bw+1)
    {
        flterr += *(pter-2)*(5/cons);
        if(j > bh) flterr += *(pter-ww-2)*(3/cons);
        if(j > bh+1) flterr += *(pter-ww-ww-2)/cons;
    }
    if(i < ww-bw-1)
    {
        if(j > bh) flterr += *(pter-ww+1)*(5/cons);
        if(j > bh+1) flterr += *(pter-ww-ww+1)*(3/cons);
    }
    if(i < ww-bw-2)
    {
        if(j > bh) flterr += *(pter-ww+2)*(3/cons);
```

```
            if(j > bh+1) flterr += *(pter-ww-ww+2)/cons;
    } return(flterr);
} void move_er(ptvv,pter,ww,hh,bh)
int    ww,hh,bh;
float *ptvv,*pter;
{
/*
 * move pter and ptvv
 *
 */ register int   pix, i, j;

for(j = -bh; j < 0; j++)
    {
        for(i = 0; i < ww; i++)
        {
            pix = j*ww+i;

*(pter+pix) = *(pter+pix+ww);
            *(ptvv+pix) = *(ptvv+pix+ww);
        }
    } for(i = 0; i < ww; i++)
        *(pter+i) = 0.;
} void win_er(ptbb,ptvv,pter,ww,hh,alfa,beta,gama)
int             ww,hh;
float           alfa,beta,gama;
unsigned char *ptbb;
float           *ptvv,*pter;
{
/*
 * 2-D ink spreading;
 *
 *    ptb: current binary        image PIXEL
 *    pta: current ink spreading image PIXEL
 *
 */ float       pix_ink();
    register int pix, ii, jj, ia, ib, ja, jb;
    float       pp;

ja = -1;
    jb =  0;
    ia = -1;
    ib =  1;

for(jj = ja; jj <= jb; jj++)
    {
        for(ii = ia; ii <= ib; ii++)
        {
            pix = jj*ww+ii;

pp = pix_ink(ptbb+pix,ww,hh,alfa,beta,gama);

*(pter+pix) = pp-*(ptvv+pix);
```

```c
        }
    }
} float pix_ink(ptbb,ww,hh,alfa,beta,gama)
int            ww,hh;
float          alfa,beta,gama;
unsigned char *ptbb;
{
/*
 * 2-D ink spreading;
 *
 * ptb: current binary image PIXEL;
 *
 */ unsigned char bnn, bss, bww, bee;
    unsigned char bnw, bne, bsw, bse;
    float         pppp;

if(*ptbb == 1)          /******* PIXEL IS "ON" (INK) **********/
    {
        pppp = 0.;
    }
    else if(*ptbb == 0)     /******* PIXEL IS "OFF" (NO INK) ******/
    {
        bnn = *(ptbb-ww);
        bss = *(ptbb+ww);
        bww = *(ptbb-1);
        bee = *(ptbb+1);
        bnw = *(ptbb-ww-1);
        bsw = *(ptbb+ww-1);
        bne = *(ptbb-ww+1);
        bse = *(ptbb+ww+1);

pppp = 255.;

if(bnn == 1) pppp -= alfa*255;
        if(bss == 1) pppp -= alfa*255;
        if(bww == 1) pppp -= alfa*255;
        if(bee == 1) pppp -= alfa*255;

if(bnn == 1 && bww == 1) pppp += gama*255;
        if(bnn == 1 && bee == 1) pppp += gama*255;
        if(bss == 1 && bww == 1) pppp += gama*255;
        if(bss == 1 && bee == 1) pppp += gama*255;

if(bnn == 0 && bww == 0 && bnw == 1) pppp -= beta*255;
        if(bnn == 0 && bee == 0 && bne == 1) pppp -= beta*255;
        if(bss == 0 && bww == 0 && bsw == 1) pppp -= beta*255;
        if(bss == 0 && bee == 0 && bse == 1) pppp -= beta*255;
    }
    else
        pppp = 127.;

return(pppp);
} void inkparam(ro,alfa,beta,gama)
float ro,*alfa,*beta,*gama;
{
/*
 *
 *
```

```
    *
    */ float  roo, a, fi;

roo = ro*ro;
        a = sqrt(2*roo-1);

fi = asin(1/(sqrt(2.)*ro));

*alfa = .25*a + .5*roo*fi - .5;

*beta = .125*roo*PI
                -.5*roo*asin(1./(sqrt(2.)*ro))
                -.25*a+.25;

*gama = .5*roo*asin(sqrt((roo-1)/roo)) - .5*sqrt(roo-1) - *beta;

}
```

LISTING 2

```
/*
 *
 *         ***********************************
 *         *       Copyright (c) 1992 AT&T    *
 *         *          All Rights Reserved    *
 *         ***********************************
 *
 * AUTHOR: THRASYVOULOS N. PAPPAS
 *
 * LEAST-SQUARES MODEL-BASED HALFTONING OF A COLOR
 *    (OR GRAY-SCALE) IMAGE
 * USES 3 X 3 PRINTER MODEL (SEPARABLE COLOR OR GRAY-SCALE)
 *
 * ASSUMES IMAGE HAS ALREADY BEEN INTERPOLATED TO DESIRED RESOLUTION.
 *
 * INPUT CONTINUOUS-TONE IMAGE IS IN "PICFILE" FORMAT
 *      ("RGB" OR "BW" FORMAT).
 * INPUT HALFTONE IMAGE (STARTING POINT) IS IN "PICFILE" FORMAT
 *      ("RGB" OR "BW" FORMAT).
 * OUTPUT IMAGE IS "BITMAP" CLASS IN "PICFILE" FORMAT.
 *
 * ASSUMES THAT IMAGE OUTSIDE BORDERS IS WHITE.
 *
 *       DEFAULT EYE FILTER: SEPARABLE 19 X 19.
 *
 *       DOT-OVERLAP PARAMETER: rho [1.0]
 *
 *                  1.0 <= rho <= 1.414
 *
 *       niter: NUMBER OF ITERATIONS (NORMALY 5).
 *
 *              ptim: input          image
 *              ptyy: input          image (border)
 *              ptbb: binary         image (border)
 *              ptaa: printer model  image (border)
 */ define usage() fprintf(stderr,\
 "usage: lsmb [-i input] [-o output] [-b bin_input]     \
\n                [-f filter] [-n niter] [-a rho]       \
\n                [-fg(filter gray-scale image)]        \
\n");

#include <math.h>
#include <stdio.h>
#include <signals.h>
#define FFF "/usr/pappas/lib/filters_2d"
define PI 3.141592653589793 float flt2d(), pix_ink();

main(argc, argv)
int argc;
char *argv[];
{
    float       cons, werror();
    void        win_ink(), inkparam();
    int         i, j, hh, ww, n, niter, bflag, fflag;
    int         nc, k, nchan;
    int         hhh, www, sh, sw, bh, bw;
    int         fh, fw, fdim;
    int         fhh, fww;      /* height and width of filter */
    float       *ptflt, *ptfl; /* points to filter matrix */
    float       alfa, gama, beta, rho;
    Signal      *ptsigim;      /* points to image Signal */
```

```
Signal        *ptsigin;     /* points to image Signal */
Signal        *ptsigou;     /* points to image Signal */
Signal        *ptsigyy;     /* points to image Signal */
Signal        *ptsigxx;     /* points to image Signal */
Signal        *ptsigbb;     /* points to image Signal */
Signal        *ptsigaa;     /* points to image Signal */
unsigned char *ptim;        /* points to image data */
unsigned char *ptin;        /* points to image data */
unsigned char *ptou;        /* points to image data */
unsigned char *ptyy;        /* points to image data */
float         *ptxx;        /* points to image data */
float         *ptaa;        /* points to image data */
unsigned char *ptbb;        /* points to output image data */
char          buf1[200], buf2[200], buf3[200];
char          buf4[200], bff4[200];

FILE *fopen(), *fp4;

sprintf(buf1,"play.pic");   /* default infile (picfile) */
sprintf(buf2,"junk.pic");   /* default binary infile (picfile) */
sprintf(buf3,"junk");       /* default outfile (picfile) */
sprintf(buf4,"aaf30x.19");  /* default filter */
bflag = 0;                  /* default binary infile (picfile) */
fflag = 0;                  /* default: do not filter cont-tone image */
sh = 0;                     /* default squared error window height */
sw = 0;                     /* default squared error window width */
niter = 5;                  /* default number of iteratoins */
rho = 1.0;                  /* default ink spreading ratio */ while(argc-- > 1)
    if(argv[argc][0] == '-')
        switch(argv[argc][1])
        {
            case 'u':
                usage();
                exit(-1);
            case 'i':
                sprintf(buf1,"%s",argv[argc+1]);
                break;
            case 'b':
                sprintf(buf2,"%s",argv[argc+1]);
                bflag = 1;
                break;
            case 'o':
                sprintf(buf3,"%s",argv[argc+1]);
                break;
            case 'f':
                if(argv[argc][2] == 'g')
                    fflag = 1;
                else
                    sprintf(buf4,"%s",argv[argc+1]);
                break;
            case 'n':
                sscanf(argv[argc+1],"%d",&niter);
                break;
            case 'a':
                sscanf(argv[argc+1],"%f",&rho);
                break;
            default:
                break;
        } if(rho < 1.0 || rho > 1.414)
{
    printf("Error in printer parameter specification\n");
    exit(-1);
```

```
    }
    else
        inkparam(rho,&alfa,&beta,&gama);

/******************************************************************/ sprintf(bff4,"%s/%s",FFF,buf4);
    if((fp4 = fopen(bff4,"r")) == NULL)
    {
        printf("\n lsmb: cannot open %s\n",bff4);
        exit(-1);
    }

/* Read height and width of filter   */
    if(fscanf(fp4,"%d %d",&fhh,&fww) == EOF)
    {
        printf("\n lsmb: Error in reading filter dimensions\n");
        exit(-1);
    }
    fdim = fhh*fww;
    fh = fhh/2;
    fw = fww/2;

/* Get pointer to space for filter matrix   */
    if((ptflt = (float *)malloc(fdim*sizeof(float))) == NULL)
    {
        printf("\n lsmb: Insufficient memory for filter\n");
        exit(-1) ;
    }

/*   Read in the filter matrix   */
    ptfl = ptflt;
    for (i=0; i<fdim; i++)
    {
        if(fscanf(fp4,"%f",ptfl++) == EOF)
        {
            printf("\n lsmb: Error in reading filter element %d\n",i);
            exit(-1);
        }
    } cons = 0.;
    for(j = 0; j < fhh; j++)
        for(i = 0; i < fww; i++)
            cons += *(ptflt+j*fww+i);

for(j = 0; j < fhh; j++)
        for(i = 0; i < fww; i++)
            *(ptflt+j*fww+i) /= cons;

/******************************************************************/ if((ptsigim = SigOpen_r(buf1,LINE)) == NullSignal)
    {
        printf("Error in opening Signal file for image\n");
        exit(-1);
    } if(CheckFormat(ptsigim,UCHAR) == 0) exit(-1);

hh = SignalHeight(ptsigim,0);
    ww = SignalWidth(ptsigim,0);

nchan = SignalChannels(ptsigim);

if((ptsigou = NewBitmapSignal("out",ww,hh,SignalColorspace(ptsigim),
```

```
                                    LINE)) == NullSignal)
{
    printf("Error in creating Signal for output image\n");
    exit(-1);
} copy_argv(ptsigim,ptsigou);

if(bflag == 1)
{
    if((ptsigin = SigOpen_r(buf2,LINE)) == NullSignal)
    {
        printf("Error in opening Signal file for image\n");
        exit(-1);
    } if(CheckColorspace(ptsigin,SignalColorspace(ptsigim)) == 0) exit(-1);

if(CheckFormat(ptsigin,UCHAR) == 0) exit(-1);

if(SignalHeight(ptsigin,0) != hh || SignalWidth(ptsigin,0) != ww)
    {
        printf("Image dimensions are inconsistent\n");
        exit(-1);
    } copy_argv(ptsigin,ptsigou);
}

History(ptsigou,argv);

bh = fh+sh;
bw = fw+sw;

hhh = hh+2*bh;
www = ww+2*bw;

if(SignalColorspace(ptsigim) == RGBCS)
{
    if((ptsigyy = NewRgbSignal("dummy",UCHAR,www,hhh,
                                FULLIMAGE)) == NullSignal)
    {
        printf("Error in creating Signal for bordered image\n");
        exit(-1);
    } if((ptsigbb = NewRgbSignal("dummy",UCHAR,www,hhh,
                                FULLIMAGE)) == NullSignal)
    {
        printf("Error in creating Signal for halftone image\n");
        exit(-1);
    } if((ptsigaa = NewRgbSignal("dummy",FLOAT,www,hhh,
                                FULLIMAGE)) == NullSignal)
    {
        printf("Error in creating Signal for ink image\n");
        exit(-1);
    }
}
else if(SignalColorspace(ptsigim) == BWCS)
{
    if((ptsigyy = NewBwSignal("dummy",UCHAR,www,hhh,
                                FULLIMAGE)) == NullSignal)
    {
        printf("Error in creating Signal for bordered image\n");
```

```
        exit(-1);
    } if((ptsigbb = NewBwSignal("dummy",UCHAR,www,hhh,
                                FULLIMAGE)) == NullSignal)
    {
        printf("Error in creating Signal for halftone image\n");
        exit(-1);
    } if((ptsigaa = NewBwSignal("dummy",FLOAT,www,hhh,
                                FULLIMAGE)) == NullSignal)
    {
        printf("Error in creating Signal for ink image\n");
        exit(-1);
    }
}
else
{
    printf("Input signal types not B&W, RGB, or BITMAP\n");
    exit(-1);
} for(j = 0; j < hhh; j++)
{
    if(j < bh || j >= hhh-bh)
    {
        for(k = 0; k < nchan; k++)
        {
            ptyy = SignalData(ptsigyy,k).uc+j*www;

for(i = 0; i < www; i++)
                *ptyy++ = 255;
        }
    }
    else
    {
        if(!SigRead(ptsigim))
        {
            sigerror("Error in reading signal %s row %d\n",
                    SignalName(ptsigim),ReadLocation(ptsigim));
            exit(-1);
        } for(k = 0; k < nchan; k++)
        {
            ptyy = SignalData(ptsigyy,k).uc+j*www;
            ptim = SignalData(ptsigim,k).uc;

for(i = 0; i < www; i++)
            {
                if(i < bw || i >= www-bw)
                    *ptyy++ = 255;
                else
                    *ptyy++ = *ptim++;
            }
        }
    }
}

DestroySignal(ptsigim);

for(j = 0; j < hhh; j++)
{
    if(bflag == 0 || j < bh || j >= hhh-bh)
    {
```

```
            for(k = 0; k < nchan; k++)
            {
                ptbb = SignalData(ptsigbb,k).uc+j*www;

for(i = 0; i < www; i++)
                    *ptbb++ = 0;
            }
        }
        else  /*** bflag == 1 ***/
        {
            if(!SigRead(ptsigin))
            {
                sigerror("Error in reading signal %s row %d\n",
                        SignalName(ptsigin),ReadLocation(ptsigin));
                exit(-1);
            } for(k = 0; k < nchan; k++)
            {
                ptbb = SignalData(ptsigbb,k).uc+j*www;
                ptin = SignalData(ptsigin,k).uc;

for(i = 0; i < www; i++)
                {
                    if(i < bw || i >= www-bw)
                        *ptbb++ = 0;
                    else
                    {
                        if(*ptin++ == 255) *ptbb++ = 0;
                        else               *ptbb++ = 1;
                    }
                }
            }
        }
    } if(bflag == 1) DestroySignal(ptsigin);

for(j = 0; j < hhh; j++)
    {
        if(bflag == 0 || j < bh || j >= hhh-bh)
        {
            for(k = 0; k < nchan; k++)
            {
                ptaa = SignalData(ptsigaa,k).f+j*www;

for(i = 0; i < www; i++)
                    *ptaa++ = 255.;
            }
        }
        else  /*** bflag == 1 ***/
        {
            for(k = 0; k < nchan; k++)
            {
                ptbb = SignalData(ptsigbb,k).uc+j*www;
                ptaa = SignalData(ptsigaa,k).f+j*www;

for(i = 0; i < www; i++)
                {
                    if(i < bw || i >= www-bw)
                        *ptaa++ = 255.;
                    else
                        *ptaa++ = pix_ink(ptbb,www,hhh,alfa,beta,gama);

ptbb++;
                }
```

```
            }
        }
    } if(fflag == 1)
    {
        if((ptsigxx = NewBwSignal("dummy",FLOAT,www,hhh,
                                  FULLIMAGE)) == NullSignal)
        {
            printf("Error in creating Signal for observed image\n");
            exit(-1);
        } for(k = 0; k < nchan; k++)
        {
            ptyy = SignalData(ptsigyy,k).uc;
            ptxx = SignalData(ptsigxx,k).f;

for(j = 0; j < hhh; j++)
                for(i = 0; i < www; i++)
                    *ptxx++ = *ptyy++;

ptyy = SignalData(ptsigyy,k).uc;
            ptxx = SignalData(ptsigxx,k).f;

for(j = 0; j < hhh; j++)
                for(i = 0; i < www; i++)
                {
                    if(j < bh || j >= hhh-bh || i < bw || i >= www-bw)
                        *ptyy++ = 255.;
                    else
                        *ptyy++ = flt2d(ptxx,www,hhh,fww,fhh,
                                        fw,fh,ptflt)+.5;

ptxx++;
                }
        }
    } for(k = 0; k < nchan; k++)
    {
        fprintf(stderr,"***** channel %d:\n",k);

for(n = 0; n < niter; n++)
        {
            int count=0;

fprintf(stderr,"   *** n=%d:",n);

ptyy = SignalData(ptsigyy,k).uc;
            ptbb = SignalData(ptsigbb,k).uc;
            ptaa = SignalData(ptsigaa,k).f;

for(j = 0; j < hhh; j++)
            {
                if(j%50 == 0) fprintf(stderr," j=%d",j);

for(i = 0; i < www; i++)
                {
                    float       olderr, newerr, aa;
                    unsigned char bb;
                    int         flag=0, m;

if(j < bh || j >= hhh-bh || i < bw || i >= www-bw)
                    {
                        ptbb++;
```

```
                    ptaa++;
                    ptyy++;
                    continue;
                } bb = *ptbb;

win_ink(ptaa,ptbb,www,hhh,alfa,beta,gama);

olderr = werror(ptaa,ptyy,www,hhh,
                                fww,fhh,fw,fh,ptflt,sh,sw);

for(m = 0; m < 2; m++)
                {
                    if(m < 1) *ptbb = 0;
                    else      *ptbb = 1;

win_ink(ptaa,ptbb,www,hhh,alfa,beta,gama);

newerr  = werror(ptaa,ptyy,www,hhh,
                                    fww,fhh,fw,fh,ptflt,sh,sw);

if(newerr < olderr)
                    {
                        bb = *ptbb;
                        olderr = newerr;
                        flag = 1;
                    }
                }

*ptbb = bb;

win_ink(ptaa,ptbb,www,hhh,alfa,beta,gama);

if(flag == 1) count++;

ptbb++;
                ptaa++;
                ptyy++;
            }
        } fprintf(stderr,"\n    *** n=%d:  count=%d\n",n,count);
        if(count == 0) break;
    }
}

DestroySignal(ptsigaa);
DestroySignal(ptsigyy);

if(!SigOpen_w(ptsigou,buf3))
{
    sigerror("Error in opening output signal %s\n",buf3);
    exit(-1);
} for(j = bh; j < hhh-bh; j++)
{
    for(k = 0; k < nchan; k++)
    {
        ptbb = SignalData(ptsigbb,k).uc+j*www;
        ptou = SignalData(ptsigou,k).uc;

for(i = 0; i < www; i++)
        {
            if(i < bw || i >= www-bw)
```

```
                {
                    ptbb++;
                }
                else
                {
                    *ptou = 255*(1 - *ptbb);

ptou++; ptbb++;
                }
            }
        } if(!SigWrite(ptsigou))
        {
            sigerror("Error in writing signal %s row %d\n",
                    SignalName(ptsigou),ReadLocation(ptsigou));
            exit(-1);
        }
    }

/*******************************************/ printf("\n::::::::   lsmb:\n");

printf("\n   image in : %s\n",buf1);
    if(bflag == 1)
        printf("   image in : %s (binary)\n",buf2);
    printf("   image out: %s\n",buf3);
    printf("\n   height = %d    width = %d\n",hh,ww);
    printf("\n   filter: %s\n",buf4);
    printf("   filter: height = %d    width = %d\n",fhh,fww);
    if(fflag == 1) printf("   filter continuous-tone image\n");
    printf("\n   number of iterations = %d\n",n);
    printf("\n   ink spreading: rho  = %.3f\n",rho);

printf("\n");

exit(0);
} float werror(pta,pty,ww,hh,fww,fhh,fw,fh,ptflt,sh,sw)
int             ww,hh,fww,fhh,fw,fh,sh,sw;
float           *ptflt;
float           *pta;
unsigned char   *pty;
{
/*
 * error calculation over square window;
 *
 * pta: current ink spreading image PIXEL
 * pty: current observed image PIXEL
 * ptflt: pointer to filter (fhh X fww)
 *
 */ register float  err, aa;
    register int    ii, jj, fi, fj;

err = 0.;
    for(jj = -sh; jj <= sh; jj++)
        for(ii = -sw; ii <= sw; ii++)
        {
            aa = flt2d(pta+jj*ww+ii,ww,hh,fww,fhh,fw,fh,ptflt);
            aa -= *(pty+jj*ww+ii);
            err += aa*aa;
```

```
            } return(err);
} float flt2d(ptim,ww,hh,fww,fhh,fw,fh,ptflt)
int     ww,hh,fww,fhh,fw,fh;
float *ptflt;
float *ptim;
{
/*
 * 2-D filtering;
 *
 * ptim:  pointer to current image PIXEL
 * ptflt: pointer to filter (fhh X fww)
 *
 */ register float   fltout;
    register int     ii, jj, fi, fj;

fltout = 0.;
    for(jj = -fh; jj <= fh; jj++)
        for(ii = -fw; ii <= fw; ii++)
        {
            fi = fw+ii;
            fj = fh+jj;
            fltout += *(ptim+jj*ww+ii)*(*(ptflt+fj*fww+fi));
        } return(fltout);
} void win_ink(ptaa,ptbb,ww,hh,alfa,beta,gama)
int             ww,hh;
float           alfa,beta,gama;
unsigned char *ptbb;
float         *ptaa;
{
/*
 * 2-D ink spreading;
 *
 *    ptbb: current binary         image PIXEL
 *    ptaa: current ink spreading image PIXEL
 *
 */ register int pix, ii, jj, ia, ib, ja, jb;

ja = -1;
    jb =  1;
    ia = -1;
    ib =  1;

for(jj = ja; jj <= jb; jj++)
    {
        for(ii = ia; ii <= ib; ii++)
        {
            pix = jj*ww+ii;

*(ptaa+pix) = pix_ink(ptbb+pix,ww,hh,alfa,beta,gama);
        }
    }
}
```

```
float pix_ink(ptbb,ww,hh,alfa,beta,gama)
int             ww,hh;
float           alfa,beta,gama;
unsigned char *ptbb;
{
/*
 * 2-D ink spreading;
 *
 * ptb: current binary image PIXEL;
 *
 */ unsigned char bnn, bss, bww, bee;
    unsigned char bnw, bne, bsw, bse;
    float         pppp;

if(*ptbb == 1)          /******* PIXEL IS "ON" (INK) *******/
    {
        pppp = 0.;
    }
    else if(*ptbb == 0)     /******* PIXEL IS "OFF" (NO INK) *****/
    {
        bnn = *(ptbb-ww);
        bss = *(ptbb+ww);
        bww = *(ptbb-1);
        bee = *(ptbb+1);
        bnw = *(ptbb-ww-1);
        bsw = *(ptbb+ww-1);
        bne = *(ptbb-ww+1);
        bse = *(ptbb+ww+1);

pppp = 255.;

if(bnn == 1) pppp -= alfa*255;
        if(bss == 1) pppp -= alfa*255;
        if(bww == 1) pppp -= alfa*255;
        if(bee == 1) pppp -= alfa*255;

if(bnn == 1 && bww == 1) pppp += gama*255;
        if(bnn == 1 && bee == 1) pppp += gama*255;
        if(bss == 1 && bww == 1) pppp += gama*255;
        if(bss == 1 && bee == 1) pppp += gama*255;

if(bnn == 0 && bww == 0 && bnw == 1) pppp -= beta*255;
        if(bnn == 0 && bee == 0 && bne == 1) pppp -= beta*255;
        if(bss == 0 && bww == 0 && bsw == 1) pppp -= beta*255;
        if(bss == 0 && bee == 0 && bse == 1) pppp -= beta*255;
    }
    else
        pppp = 127.;

return(pppp);
} void inkparam(ro,alfa,beta,gama)
float ro,*alfa,*beta,*gama;
{
    float   roo, a, fi;

roo = ro*ro;
    a = sqrt(2*roo-1);
```

```
fi = asin(1/(sqrt(2.)*ro));

*alfa = .25*a + .5*roo*fi - .5;

*beta = .125*roo*PI
        -.5*roo*asin(1./(sqrt(2.)*ro))
        -.25*a+.25;

*gama = .5*roo*asin(sqrt((roo-1)/roo)) - .5*sqrt(roo-1) - *beta;
}
```

I claim:

1. A method for generating an array of output image signals suitable for application to a display device to generate a color halftone image in response to an array of input signals a color image, said method comprising the steps of:

(a) forming past signals predictive of regions of color halftone images formed by said display device in response to applied image signals;

(b) modifying each of a plurality of said input signals in response to one or more past error signals, said past error signals reflecting differences between past modified input signals and said past signals predictive of regions of color halftone images (c) forming an output image signal in response to each of a plurality of said modified input signals.

2. The method of claim 1 wherein the output image signal comprises a plurality of color component signals.

3. The method of claim 2 wherein the step of forming an output image signal in response to each of a plurality of said modified input signals comprises the step of assigning a first value to a color component signal when a modified input signal of the same color component exceeds a threshold value, and assigning a second value to said color component signal when said color component signal fails to exceed said threshold value.

4. The method of claim 1 wherein the display device comprises a printer and wherein step a. is performed with a printer model, the printer model reflecting distortions introduced by the printer in response to an array of output image signals.

5. The method of claim 4 wherein the printer model relates a plurality of output image signals, at least one of which output image signals corresponds to a first location, to a printed color level signal at the first location.

6. The method of claim 5 wherein an output image signal and a printed color level signal each comprise a plurality of color component signals.

7. The method of claim 4 wherein the printer model is based on a separable function of color components.

8. The method of claim 7 wherein the input image signal comprises a plurality of color component signals and wherein steps a., b., and c. are applied separately for each color component signal of the input image signal.

9. The method of claim 4 wherein the printer model is based on a nonseparable function of color components.

10. A method for displaying a color image at a second location based on a continuous tone color image at a first location, the color image generated by a display device located at a second location, the method comprising the steps of:

(a) receiving at the second location a set of input signals representing the continuous tone image;

(b) determining a color halftone image based on the received set of input signals, the step of determining the color halftone image including the steps of (1) forming past signals predictive of regions of color halftone images formed by said display device in response to applied color image signals, (2) modifying each of a plurality of said input signals in response to one or more past error signals, said past error signals reflecting differences between past modified input signals and said past signals predictive of regions of color halftone images, and (3) forming an output image signal in response to each of a plurality of said modified input signals; and (c) displaying the color halftone image with use of the plurality of output image signals.

11. A method of generating an array of image signals suitable for application to a display device to generate a color halftone image in response to an array of signals characterizing a color image and an array of initial image signals, said display device for generating spots at selected ones of regularly spaced positions on a display surface, said method characterized by a repeated sequence of steps, each repetition of the sequence of steps operating on an array of input signals and producing an array of output signals, said initial signals for use as said input signals on an initial pass through said sequence of steps, said output signals of said sequence of steps suitable for use as said input signals in a subsequent repetition of the sequence of steps, the method comprising the steps of:

performing said sequence of steps, said sequence including:

filtering a plurality of said input signals using a filter reflecting characteristics representative of said display device to produce first signals representing an estimate of an output of said display device, wherein said filtering comprises forming a non-linear function of said input signals that generates said first signals, said function representing interaction of one or more displayed spots;

filtering said first signals using an eye-model filter to produce second signals;

forming an error signal representative of a difference between said signals characterizing a color image and said second signals;

selectively modifying one or more of said input signals based on said error signal to produce said output signals; and repeating said sequence of steps one or more times until said output signals realize a preselected error criterion, said output signals which realize said error criterion for application to said display device.

12. The method of claim 11 further comprising the step of filtering said array of signals characterizing a color image using a second eye-model filter reflecting characteristics of human vision to derive an array of signals representative of an estimate of the color image as perceived by the human eye.

13. The method of claim 11 wherein said output image signals comprise a plurality of color component signals.

14. The method of claim 11 wherein the display device comprises a printer and wherein the filter reflecting characteristics representative of said display device comprises a printer model, the printer model reflecting distortions introduced by the printer in response to an array of said input signals.

15. The method of claim 14 wherein the printer model relates a plurality of input signals, at least one of which input signals corresponds to a first location, to a printed color level signal at the first location.

16. The method of claim 15 wherein an input signal and a printed color level signal each comprise a plurality of color component signals.

17. The method of claim 14 wherein the printer model is based on a separable function of color components.

18. The method of claim 17 wherein the array of signals characterizing the color image comprises a plurality of color component signals and wherein the method steps are applied separately for each color component of the array of signals characterizing the color image.

19. The method of claim 14 wherein the printer model is based on a nonseparable function of color components.

20. A method for displaying a color image at a second location based on a continuous tone color image at a first location, the second location receiving a set of signals representing the continuous tone image, the color image generated by a display device located at a second location, said display device for generating spots at selected ones of regularly spaced positions on a display surface, said method characterized by a repeated sequence of steps, each repetition of the sequence of steps operating on an array of input signals and producing an array of output signals, said initial signals for use as said input signals on an initial pass through said sequence of steps, said output signals of said sequence of steps suitable for use as said input signals in a subsequent repetition of the sequence of steps, the method comprising the steps of:

receiving at the second location the set of signals representing the continuous tone color image;

determining a color halftone image based on the received set of signals representing the continuous tone color image, the step of determining the color halftone image including the steps of:

filtering a plurality of input signals using a filter reflecting characteristics representatives of said display device to produce first signals representing an estimate of an output of said display device;

filtering said first signals using an eye-model filter to produce second signals, wherein said filtering comprises forming a non-linear function of said initial or corrected image signals that generates said first signals, said function representing interaction of one or more displayed spots;

forming an error signal representative of a difference between said signals representing the continuous tone color image and said second signals;

selectively modifying one or more of said input signals based on said error signal to produce said output signals; and repeating said sequence of steps one or more times until said output signals realize a preselected error criterion, said output signals which realize said error criterion for application to said display device; and displaying the color halftone image with use of the plurality of output signals.

21. A method of color halftoning a color image, for display on a display device, said display device for generating spots at selected ones of regularly spaced positions on a display surface, the color image represented by an array of one or more input signals, the method comprising the steps of:

generating an array of one or more signals representing at least a portion of a predicted display of a color halftone image with use of a color display model, the model representing color display distortion;

forming an array of one or more error signals reflecting a difference between the array of signals representing at least a portion of a predicted color halftone image and an array of one or more signals reflecting said array of input signals; and determining an array of one or more signals for application to a display device based on said array of error signals;

wherein said color display model comprises a non-linear function of signals suitable for application to said display device, which function generates said array of one or more signals and represents interaction of one or more displayed spots.

* * * * *

UNITED STATES PATENT AND TRADEMARK OFFICE
CERTIFICATE OF CORRECTION

PATENT NO.    : 5,473,439
DATED         : December 5, 1995
INVENTOR(S)   : Thrasyvoulos N. Pappas It is certified that error appears in the above-identified patent and that said Letters Patent is hereby corrected as shown below:

Column 61, claim 1, line 5, after "signals" insert --representing--.
Column 62, claim 15, line 53, change "input" (first occurrence) to --output image--.
Column 62, claim 15, line 53, change "input" (second occurrence) to --output image--.
Column 62, claim 16, line 56, change "input" to --output image--.

Signed and Sealed this

Twenty-fourth Day of September, 1996

Attest:

BRUCE LEHMAN

*Attesting Officer*         *Commissioner of Patents and Trademarks*